United States Patent [19]

Roeser

[11] Patent Number: 4,941,197
[45] Date of Patent: Jul. 10, 1990

[54] ROLLER BEARING DEVICE AND APPARATUS USING SAME

[75] Inventor: John O. Roeser, Barrington, Ill.

[73] Assignee: Otto Engineering, Inc., Carpentersville, Ill.

[21] Appl. No.: 315,908

[22] Filed: Feb. 27, 1989

[51] Int. Cl.⁵ .............................................. F16C 29/06
[52] U.S. Cl. ......................................... 384/44; 384/9; 384/15; 384/40
[58] Field of Search .................... 384/9, 15, 40, 43–45; 464/168

[56] References Cited

U.S. PATENT DOCUMENTS

| | | | |
|---|---|---|---|
| 4,302,059 | 11/1981 | Teramachi | 384/44 |
| 4,396,235 | 8/1983 | Teramachi | 384/44 |
| 4,496,197 | 1/1985 | Kwon | 384/44 |
| 4,511,189 | 4/1985 | Mottate | 384/44 |
| 4,563,045 | 1/1986 | Katayama | 384/44 |
| 4,583,793 | 4/1986 | Blatter | 384/44 |
| 4,659,238 | 4/1987 | Teramachi | 384/44 |
| 4,687,345 | 8/1987 | Geka | 384/44 |
| 4,688,950 | 8/1987 | Yokota | 384/44 |
| 4,692,036 | 9/1987 | Kawaguchi | 384/44 |
| 4,692,037 | 9/1987 | Kasai | 384/44 |
| 4,715,729 | 12/1987 | Tanaka | 384/44 |
| 4,735,514 | 4/1988 | Kasai | 384/44 |
| 7,702,622 | 10/1987 | Teramachi | 384/44 |

Primary Examiner—Thomas R. Hannon
Attorney, Agent, or Firm—Robert D. Silver

[57] ABSTRACT

Presented is a slide roller apparatus of elegant simplicity, high precision/cost ratio and few parts where the car/track/rollers are relatively movable and the only needed parts (excepting for attachment means). The car is unitary without end caps for the roller groove, the roller groove being machined or otherwise formed into the car with great precision. The ends of the rollers have a sliding engagement with a rail track surface. The tracks and cars may be made of high precision extruded aluminum hard coated and impregnated with a high lubricity material. The rollers preferably are softer than the tracks and may be made of plastic material. The slide roller apparatus has far ranging applications from sail boats to machine tools.

54 Claims, 13 Drawing Sheets

FIG. 6
FIG. 7
FIG. 8
FIG. 9
FIG. 10
FIG. 11
FIG. 12

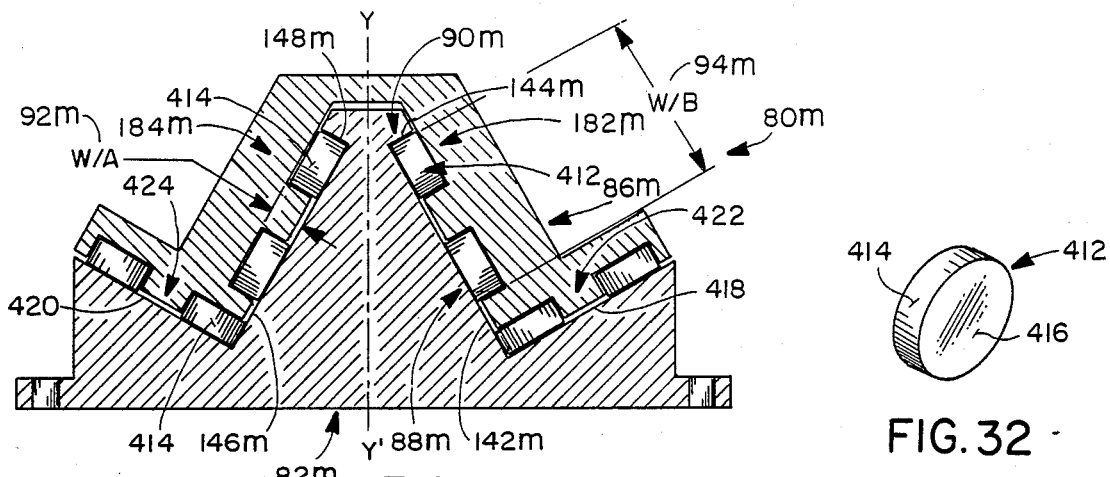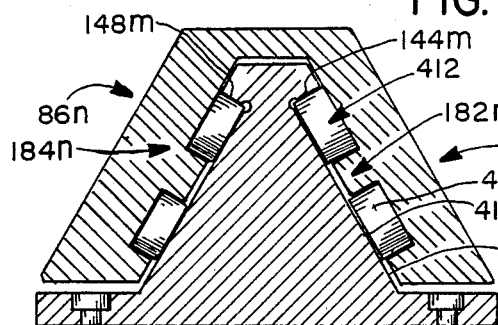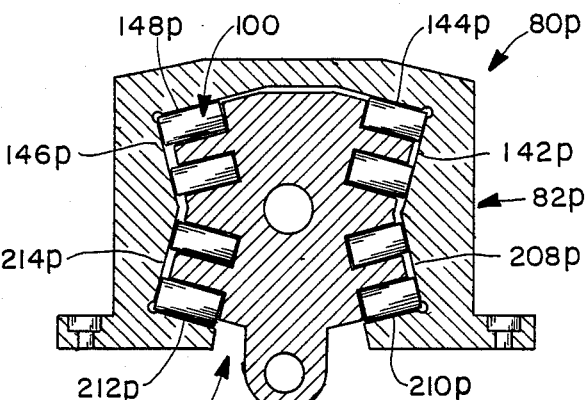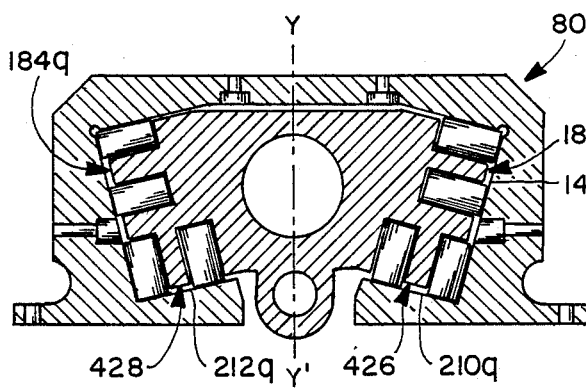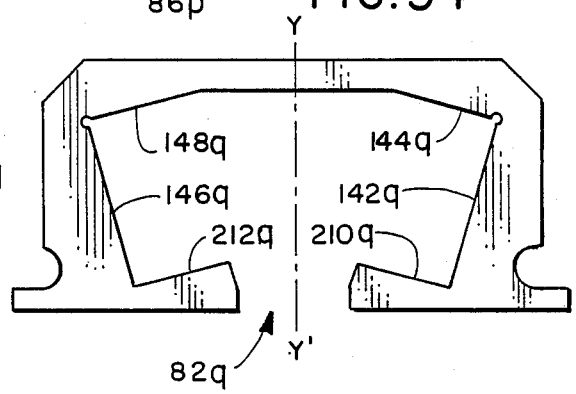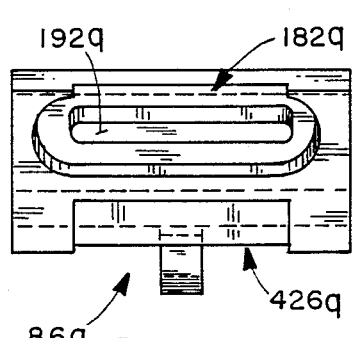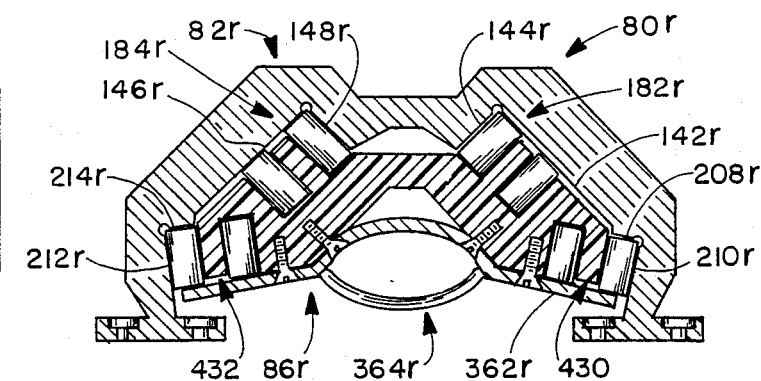

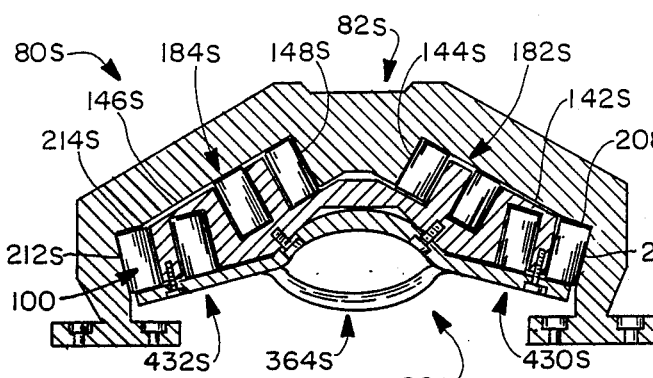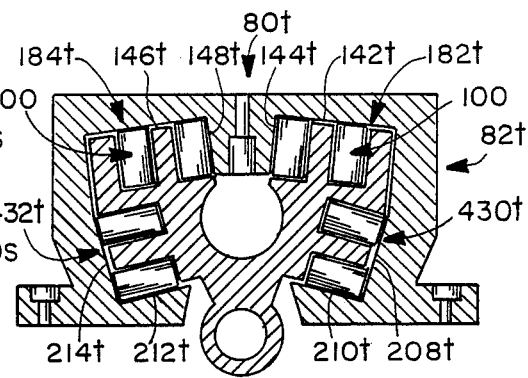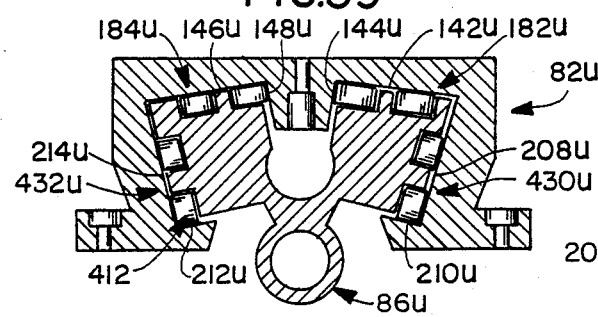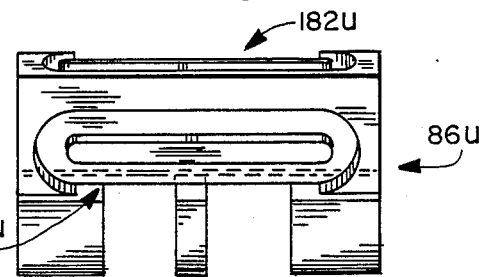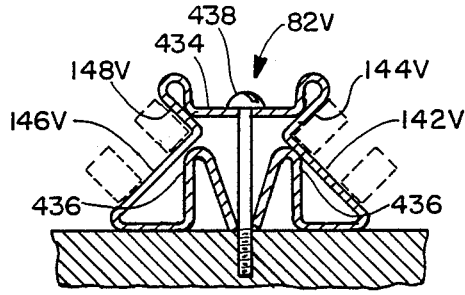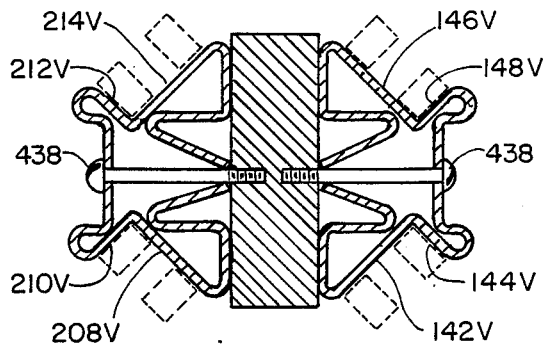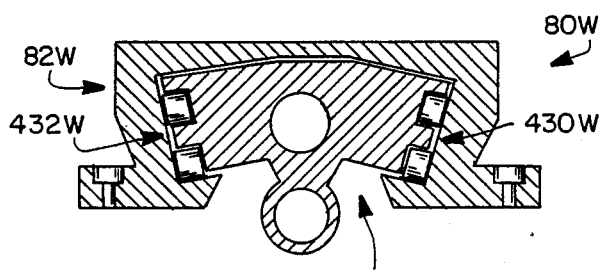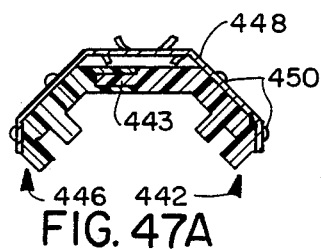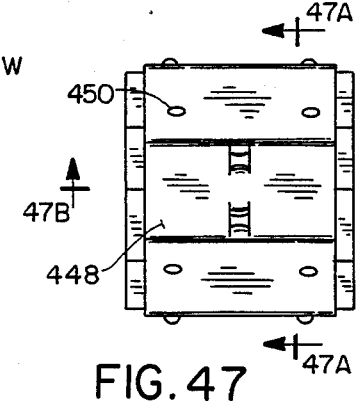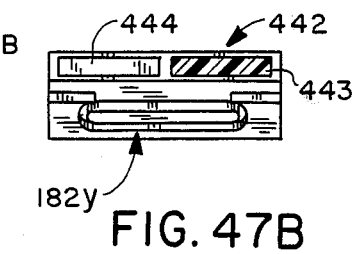

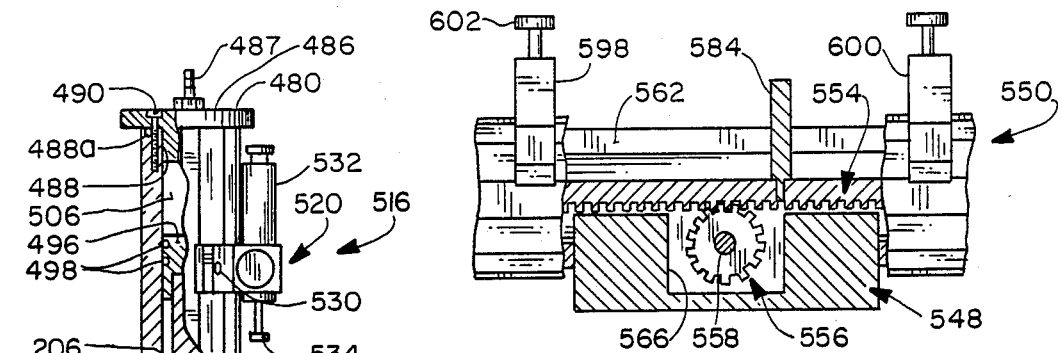
FIG. 48A
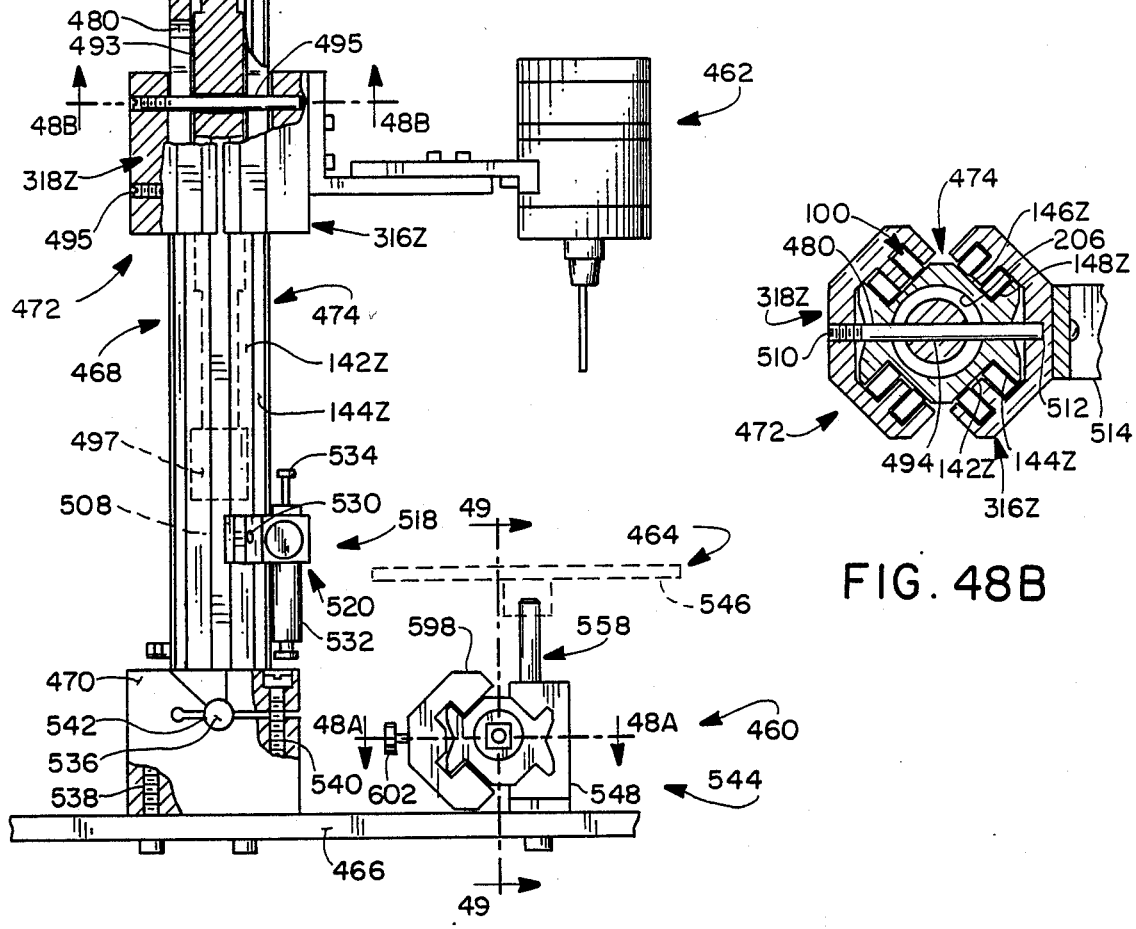
FIG. 48B
FIG. 48
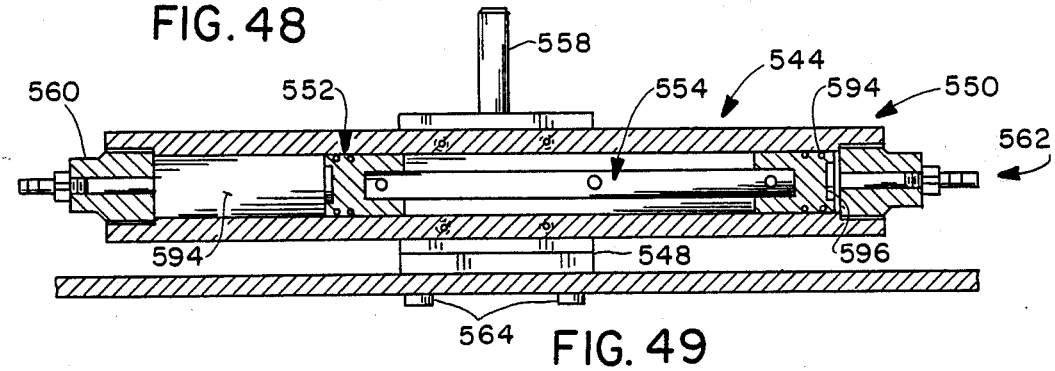
FIG. 49

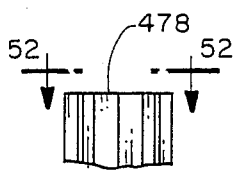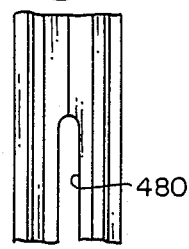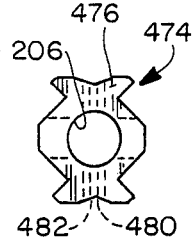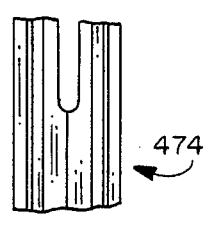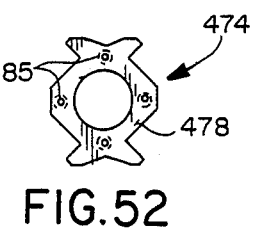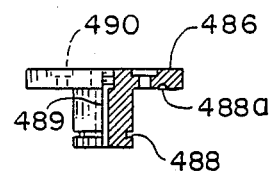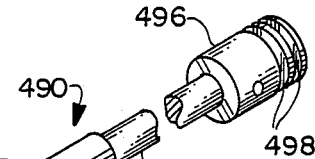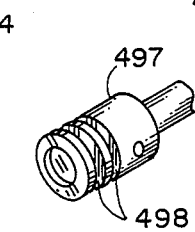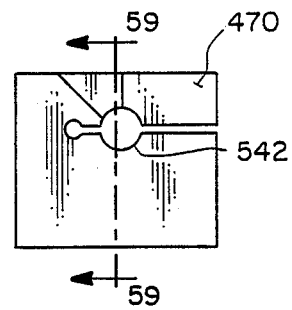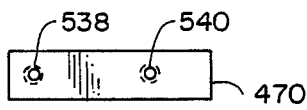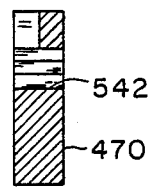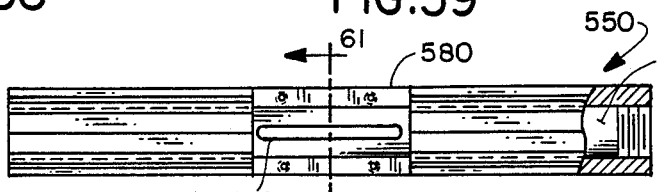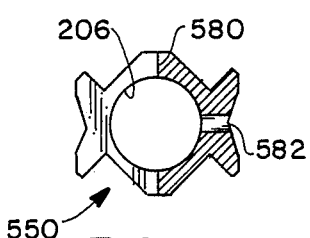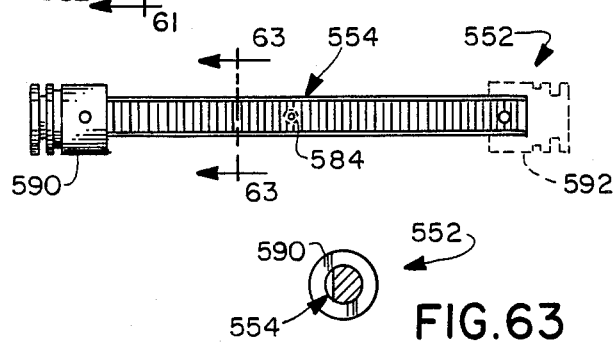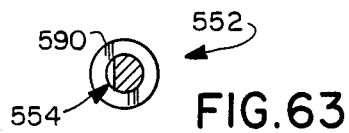

ROLLER BEARING DEVICE AND APPARATUS USING SAME

BACKGROUND OF THE INVENTION

This invention relates to roller bearing devices of elegant simplicity wherein endless circulating cylindrical rollers are interposed between two members to facilitate relative motion therebetween and in combination with certain apparatus where they have found good utility. More specifically it relates to what is sometimes called a parallel roller type device wherein a plurality of rollers are located in and fill an endless groove, are generally aligned each with the next adjacent roller, and roll in the same general direction. In the preferred approach, they are characterized as having the diameter (end faces) and length of differing size, although in this connection the diameter may be either larger or smaller than the length of the roller.

Heretofore in bearing devices where infinite rectilinear motion between two members is a desired use, cross axis rollers and parallel rollers have been used. Cross axis rollers accept loads between two members from every direction, however at the expense of generally having only one half of the members working to carry the load at any point in time, complexity in manufacture of the groove and/or retention of rollers therein, difficulty at the transition from bearing to non bearing relationship, limitation on the practical number of rollers that can be used, and a variety of other problems which are partially explicated in issued U.S. Pat. No. 4,688,950 invented by Yasunori Yokota, assigned to Nippon Thompson Co., dated Aug. 25, 1987 and U.S. Pat. No. 4,511,189 of Tatsuo Mottate, dated Apr. 16, 1985 assigned to the same assignee.

On the other hand, so called parallel roller devices having endless circulation passages and which may be burdened from every direction are by conventional wisdom conceived of as necessitating at least four rows of endless circulation passages, (one to receive a load from each of the four load quadrants toward the center). (See e.g. Col. 1 of U.S. Pat. No. 4,735,514 of Namomi Kasai dated Apr. 5, 1988, also assigned to Nippon Thompson Co.) The conventional wisdom further concludes that such parallel construction has the necessary defects of large height and width per bearing per unit load capabilities or much complication is involved (with consequent tolerance build up) or both.

Another aspect of prior art problems is the obtainment of a relatively high degree of precision in roller bearings with moderate cost. The precision of the end product is a function of the inherent tolerances involved in the various potential methods of manufacture, tolerance build up occasioned by assembly of components, and types of material employed. Generally in the prior art, obtainment of precision is possible at great cost. As a generalism however, the less parts employed, the less total tolerance build up encountered.

Also in the prior art, the providing of a four quadrant mechanism to handle all direction burden often adds unnecessary cost. That obtains in those devices where the use does not require that the burdens encountered on the bearing device be uniform—i.e. it is quite common that burdens on the device will be larger and of substantially larger duration in two of the four quadrants with the opposite two quadrants receiving relatively lighter burdens which are often transitory. Thus the expense of providing the usual mirror image type capability of four quadrant loading is often needlessly high, since the precision and load capabilities in two quadrants exceeds field requirements.

Another prior art problem is the location of the bearing in potentially dirty environments where occasional debris is encountered which may be capable of expensive damage to both of the relatively moving members (track and car) and the rollers. With respect to comparative costs between the members and the rollers, it will be appreciated that the track and car members are more expensive and damage to either of these car or track members causes considerably more expense to replace compared to the much less costly rollers.

Another prior art problem has been the inability to provide relatively good corrosion resistance to parallel roller bearing structures at reasonable cost while maintaining a relatively high degree of precision.

Another problem in the prior art devices is the complexity which is caused by numerous components. This gives deleterious resultant cost of inventory where mass manufacturing is employed and a higher cost of assembly. Field problems will also be encountered in complex assemblies which have junctions of parts in the wear path because of both potential non uniform wear, and/or minute mating of parts at their coterminus junctions.

Still another problem in the prior art is a failure to fully utilize the relatively low cost versatility of and complexity of shapes available in precision extrusions. For example internal chambers may be used for operations to effectuate relative movement of the two members separated by the bearings. Also, there is a failure to exploit the quite good geometric precision and spaced precision relationships in a variety of load bearing surfaces along the length of members without machining of the surfaces.

In sailboats and other similar apparatus which are exposed to weather and/or where humans come into intimate contact with the apparatus, prior art parallel roller devices do not simultaneously meet the desired attributes of simplicity, ease of maintenance and/or replacement, a construction which will resist trapping debris and providing a minimum of surfaces or crannies to collect unwanted dirt, and is easy to install. It will also be appreciated that the prior art devices are not constructed so as to be relatively hard to freeze up when encountering below freezing temperatures (lacks self draining construction). Also the prior art constructions do not carry high shock loads with ease at low cost, while accommodating to and operational in environments with all directional burdening.

Another prior art problem has been the relatively high cost of parallel roller bearing devices for relative rectilinear movement of members which has, from a practical standpoint, precluded their use in construction of a larger apparatus where reasonably high precision movement is needed (e.g. as in X Y Z movement apparatus used for mixing/dispensing/ratioing/pumping (or any one or combination) of work fluid(s) for precision deposition (batch or continuous). See for example co-pending application of John O. Roeser for METHOD AND APPARATUS FOR PRECISION PUMPING, RATIOING AND DISPENSING OF WORK FLUID(S) Ser. No. 07/118,330, filed Nov. 6, 1987 and assigned to Otto Engineering, Inc. In such devices Thompson rods and associated bearings were used to give reasonably high rectilinear movement precision commensurate with other components in the system at a reasonable and competitive cost (e.g. precision of movement in the range of 0.01 to 0.00001 inches or higher).

In prior art X Y Z devices, the weight and bulk of parallel roller type bearing devices has been dimensional with the consequent effects thereof. Also, such large mass, which must be moved in each of the planes, caused increased cost of power sources for movement, more support structures and had other deleterious effects. High mass and bulk of prior art parallel rollers could preclude practical use in association with certain desirable high precision but low power operators (such as linear magnetic motors), where they may be otherwise desired.

A search was conducted on the subject matter herein and the following references were developed:

| DATE | U.S. PAT. NO. | INVENTOR/ASSIGNEE |
|---|---|---|
| 4/5/88 | 4,735,514 | Kasai/Nippon Thompson Co. Ltd. |
| 12/29/87 | 4,715,729 | Tanaka/Nippon Thompson Co. Ltd. |
| 10/27/87 | 4,702,622 | Teramachi |
| 9/8/87 | 4,692,037 | Kasai/Nippon Thompson Co. Ltd. |
| 9/8/87 | 4,692,036 | Kawaguchi/Nippon Thompson Co. |
| 8/25/87 | 4,688,950 | Yokota/Nippon Thompson Co. |
| 8/18/87 | 4,687,345 | Geka/Nippon Thompson Co. |
| 4/21/87 | 4,659,238 | Teramachi |
| 1/7/86 | 4,563,045 | Katayama |
| 4/16/85 | 4,511,189 | Mottate/Nippon Thompson Co. |
| 1/29/85 | 4,496,197 | Kwon/Bendix Corporation |
| 8/2/83 | 4,396,235 | Teramachi |

SUMMARY OF THE INVENTION

With the above in mind it is the object of this invention to provide an elegant parallel roller type bearing which is easy to manufacture, has reasonable cost, and overcomes the aforenoted prior art defects.

As will be described in detail the invention features the provision of a roller bearing device of the parallel type, which in the preferred embodiment, has an endless roller groove which is constructed solely in the first member (car) in a manner which retains the rollers therein without need of caps/end plates/etc., the second member (track) together with the endless groove in the first member being the sole retention means for trappingly retaining the rollers therebetween.

Another feature of the invention is to provide a parallel roller device wherein the end surfaces of the rollers provide sliding movement and the curved surface provides rolling movement of the rollers to afford burdening of the rollers on the relatively moving members from all four load quadrants.

Another aspect is to provide an endless parallel roller type device wherein the end surfaces of each of a plurality of rollers may slidingly engage both the base of the endless U-shaped groove in one member and the opposed flat surface of the other member when the load is generally parallel to the axis of the rolling surfaces when no interposed restraint is employed, or if employed is disengaged.

The features of the invention may be further characterized as providing high lubricity surfaces for the potential sliding engagement of the end surfaces of the roller on the relatively moving members.

Another aspect is to have rollers made of softer material compared to the other two movable members of a parallel roller bearing assembly such that when debris is unavoidably trapped on the load bearing surfaces, the damage will be to the rollers rather than the rolled upon surfaces of the more costly track and car members of the assembly.

The invention features a construction wherein a pair of "relaxed rubber band shaped" grooves which are U-shaped in cross section are formed in a car for presenting a plurality of rollers into engagement with a pair of spaced right angled working portions of a track, one part of each of the right angled portions of the track being operative to receive a sliding end surface of a plurality of rollers and a second part of each of the right angled portions of the track being operative to receive rolling engagement of the rolling surface of the rollers.

Another feature of the invention is to provide a bearing apparatus having a track with a shape approximating an X shape in cross section to provide 4 bearing track surfaces, wherein the car associated with the X shaped track has a pair of endless U-shaped grooves, one such U-shaped groove being formed in each of opposite sides of a vertical center line through said X shaped track for presenting parallel rollers located therein respectively into operative relationship with each of the two angularly disposed surfaces of the track on each respective side of the vertical center line to provide a bearing of great simplicity and few parts.

Another object is to utilize a bearing of the type above discussed in relatively high precision apparatus for X axis and/or Y axis and/or Z axis devices to provide relatively high precision movement in any of or all three planed at low cost, quite low mass and relatively high precision.

Another feature is to provide a corrosion resistant and relatively high load bearing device which is easy to maintain and is well adapted for use on sailboats where humans may come into contact therewith.

Another aspect of the invention is a construction wherein both the car and the track member may be formed from extruded aluminum, which after formation of the grooves in the car, is surface coated with a high lubricity hard coat which affords easy sliding relative movement of the end surfaces of the rollers with both the track and the car, corrosion resistance of both car and track and high density wear surfaces.

Still another aspect of the invention is to provide a construction in an alternate form of bearing having many of the above characteristics wherein the track member may be roll formed with a resulting reasonably high degree of precision.

Another feature is a construction which may provide a track useful in a parallel roller devices described above wherein, in some embodiments, an extruded central elongated chamber may be formed which is well adapted to cooperate with a piston which, when operated by air pressure, etc., can move the car and track relative to each other on the parallel rollers.

Another aspect of the invention is to provide the aforementioned track chamber which is operative to surround a screw of a ball screw mechanism or a rack of a rack and pinion mechanism and thereby keep such moving parts clean from contaminant, dirt or debris which may affect precision of their movement.

A further feature is to provide a simple up down Z tower utilizing the bearing mechanism and features aforementioned which is low in cost, high in reliability and considerably lower in weight than prior devices without sacrifice of required precision of relative movement.

Another aspect of the invention is to provide a device wherein the endless grooves for receipt of the parallel rollers are geometrically arranged in the car for "single set up" machining and no machining is required for the track roller engaging working surfaces.

Another object is to provide an alternate device wherein the car may be a four groove car operating from a single side (180 degrees) only of a rail track wherein an additional element, namely a combination cover/attachment means, retains the rollers in two of the four grooves, permitting roller surface engagement type operations when loaded from any of the four quadrants while still requiring only a single car means and track means construction, there being roller loaded and non loaded versions.

Another overall feature of the inventive concepts is to provide roller bearing devices of wide versatility of uses which requires a relatively low inventory of parts.

BRIEF DESCRIPTION OF THE DRAWINGS

In the drawings which illustrate the presently preferred embodiments of the invention:

FIG. 6 is an isolated end elevational view of the end portion means of the track portion of the apparatus shown in FIG. 1;

FIG. 7 is a perspective view taken from below of the rail means shown in FIG. 6;

FIG. 8 is an end elevational view of a car means, partially in section, shown in isolation from the rest of the apparatus, and differing slightly from that shown in FIGS. 1-4;

FIG. 9 is a bottom view taken along lines 9—9 of FIG. 8;

FIG. 10 is an isolated perspective view of one of the rollers useful in the apparatus shown in FIGS. 1-4;

FIG. 11 is an end view, similar to FIG. 6, of an alternate form of a rail track means having a central aperature;

FIG. 12 is an isolated partial perspective view of the rail track means shown in FIG. 11;

FIG. 14A is a sectional view taken along lines 14A—14A of FIG. 13A;

FIG. 31 is a sectional view of an alternate embodiment;

FIG. 32 is an isolated perspective view of one form of roller usable in the embodiments of the invention shown in FIGS. 31 and 33;

FIG. 33 is a sectional view of an alternate embodiment;

FIG. 34 is a sectional view of an alternate embodiment;

FIG. 35 is a sectional view of an alternate embodiment;

FIG. 36 is an end elevational view of the rail means used in the embodiment shown in FIG. 35;

FIG. 37 is a side elevational view of the car means used in the assembly shown in FIG. 35 which cooperates with the rail means of FIG. 36;

FIG. 38 is a sectional view of an alternative embodiment of an assembly;

FIG. 39 is a sectional view of an assembly in alternate form using the inventive concepts;

FIG. 40 is a sectional view of an assembly of an embodiment using the inventive concepts;

FIG. 41 is a sectional view showing another alternate embodiment of the invention;

FIG. 42 is a side elevational view of the car means used in FIG. 41 shown in isolation;

FIG. 43 is a sectional view through an alternate form of roll formed rail means which is cooperable with the rollers of a car means being shown in part in dashed lines;

FIG. 44 is a four quadrant X shaped rail means for use where multidirectional loading is involved, and embodying two rail means essentially similar to the rail means shown in FIG. 43;

FIG. 45 is a sectional view of still another alternate form of the invention;

FIG. 46 is an alternate form of rail means shown in section and made of plastic material;

FIG. 47 is an alternate form of the invention, shown in top view which utilizes mating halves of a molded plastic car means;

FIG. 47A is a sectional view taken along lines 47A—47A of FIG. 47;

FIG. 47B is a sectional view along the lines 47B—47B of FIG. 47;

FIG. 48 is a side elevational view partially in section showing an assembly utilizing inventive concepts aforedescribed;

FIG. 48A is a sectional view along lines 48A—48A of FIG. 48;

FIG. 48B is a sectional view along lines 48B—48B of FIG. 48;

FIG. 49 is a sectional view along lines 49—49 of FIG. 48;

FIG. 50 is a side elevational view, of one of the parts of the assembly of FIG. 48 shown in isolation;

FIG. 51 is an end view taken along lines 51—51 of FIG. 50;

FIG. 52 is a side elevational view along lines 52—52 of FIG. 50;

FIG. 53 is an isolated side elevational view of a bottom piece used in the assembly shown in FIG. 48;

FIG. 54 is a view partially in section, of the top end cap of the assembly shown in FIG. 48;

FIG. 55 is a perspective view of an internal double acting piston usable with the rail means shown in FIG. 50;

FIG. 56 is a view partially in section of one of the adjustable stop means shown in the apparatus in FIG. 48;

FIG. 57 is an isolated side elevational view of a base member of the apparatus shown in FIG. 48;

FIG. 58 is a top view of the base member shown in FIG. 57;

FIG. 59 is a sectional view taken along lines 59—59 of FIG. 57;

FIG. 60 is a top view, partially in section, of one of the parts shown in the assembly shown in FIG. 48;

FIG. 61 is a sectional view taken along the lines 61—61 of FIG. 60;

FIG. 62 is an isolated view of the piston means used internally of a rail means of FIG. 60;

FIG. 63 is a sectional view taken along the lines 63—63 of FIG. 62;

DETAILED DESCRIPTION

Referring now to FIGS. 1–10 the apparatus 80 shown therein has particular usefulness in sailboats and shall now be described. The apparatus 80, may be denominated a slide roller apparatus and incorporates the precepts of the inventive concepts. While this invention of a slide roller apparatus 80 shall be first described in connection with a sailboat apparatus, it will be appreciated that it is useful in a multitude of other environments as will be obvious from the description hereinafter.

Figure 1:
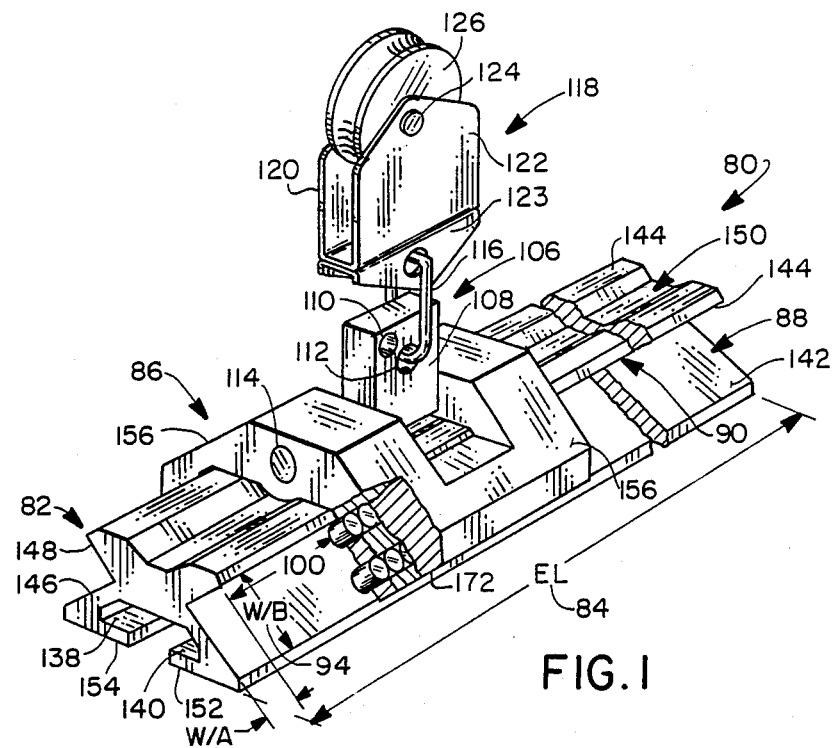
FIG. 1 is a perspective view, partially in section of an apparatus for use in sailboats and embodying the inventive concepts.
Figure 2:
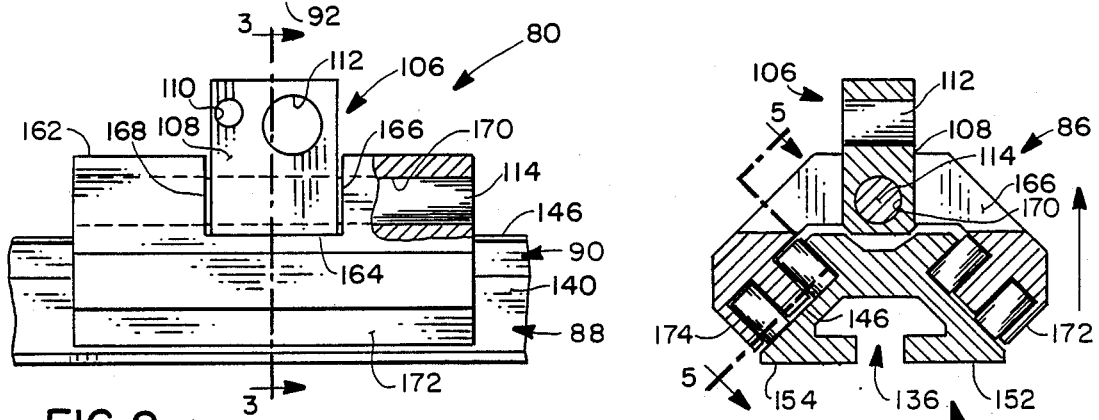
FIG. 2 is a side elevational view, partially in section showing portions of the apparatus shown in FIG. 1.

The slide roller apparatus 80 comprises a rail track means 82 having an elongated length shown by the reference numeral 84 and denominated EL in perspective drawing FIG. 1. The car means 86 is adapted to move relatively to the rail means 82 (the car means 86 may be fixed and the rail means 82 movable, or rail track means 82 will be movable and the car means 86 may be fixed).

A first rail track surface means 88 and second rail track surface means 90 are formed in the side of rail track means 82 and angularly disposed relative to each other along the length 84 of the rail track means 82. The length 84 is situation dependent, but is always longer than the length of the car means 86. Second rail track surface means 90 has a predetermined width W/A 92 wider than the width W/B 94 of the first rail track surface means 88. Roller means 100 are mounted for simultaneous engagement with the car means 86 and the rail track means 82, and is engageable with the rail track surface means 88 and 90 along the length EL 84 of the rail track means, however this engagement is not simultaneous.

Figures 6, 7, 8, 9, 10, 11, 12:
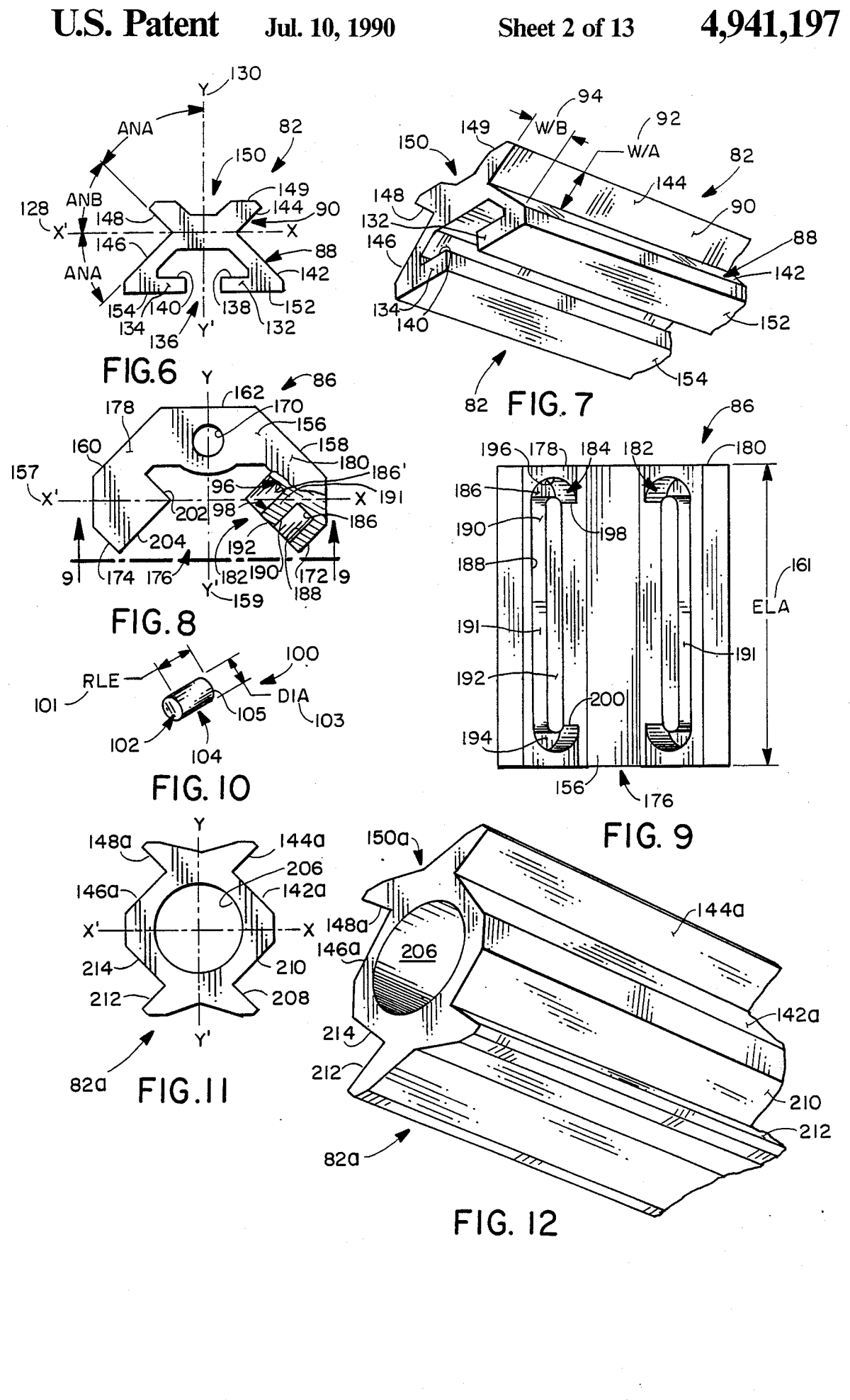

The car means 86 has a first car surface means 96 and a second car surface means 98 perhaps best seen in FIG. 8. Roller means 100 has a roller first surface means 102 which is the transverse end surface of the roller and a roller means length RLE 101 along the roller means second surface (the cylindrical rolling surface) 104. The roller means 100 has a roller means diameter denominated DIA 103 shown in FIG. 10. The diameter 103 and its relationship to the length 101 of the roller means may vary relative to each other. The cylindrical surface means 104 (second surface) of the roller means 100 is the rolling surface of the roller and is trapped for simultaneous rolling engagement with the second rail track surface means 90 and the second car surface means 98. The end surface means 102 is disposed at right angles to the rolling surface means 104 and the end surface means and the opposite end 105 are respectively engageable with first track surface means 88 and car first surface means 96. Before describing the particular structural and geometric relationships between the roller means 100, the car means 86 and the rail track means 82, the attachment means 106 for the car means as shown in FIGS. 1-4, shall be described.

Relative movement of the car means and the rail track means 82 is translatable into useful work when some sort of an attachment means such as that shown at 106 is employed to make use of the relative movement. This may take many forms. In the embodiment shown in FIGS. 1-5, the rail means 82 is fixed and the car means 86 is adapted to move in both directions on the rail track means 82 on the roller means 100. The attachment means 106 comprises an upstanding pivotal lug member 108 having cross bores 110 and 112 for receipt of another attachment means such as a shackle member 116.

The lug 108 may be pivotally mounted on a large diameter through pin 114. The shackle link member 116 mounts a pulley means 118 comprising a pair of spaced apart upstanding support members 120, 122 which are mounted to an inverted U-shaped in cross section base 123 having cross mounting bores. The base 123 is connected to the shackle link member 116 as shown. A suitable cross pin 124 pivotally mounts a pulley sheeve member 126 which is useful to receive a line (not shown) from the outboard corner of for example a sail or connected to the end of a boom etc.

Some of the advantages of the assembly 80 shown will be apparent when it is considered that the apparatus 80 is adapted to be put under high stress load by virtue of the variable wind forces, mainly in an upwardly direction as viewed in the drawings. The roller surface 104 of a plurality of rollers takes this high stress load and distributes it to the second track surface means 90 (see FIGS. 6 and 7). In order to move or adjust the position of the apparatus 80 (and thereby move the position of the outboard end of the sail or of a boom) the ability to move the car means 86 under load is required. Also once the apparatus 80 is anchored in any one particular spot (by means not shown in these figures, but certain adjustable stops are shown in FIGS. 56 and 48) the apparatus 80 may become subjected to forces from all quadrants and of widely diverse nature including downwardly. This may occur also during movement of the apparatus. The ability to withstand unexpected stress loads (shocks) both when temporarily anchored and when operating, and under any and all of the designed rated capacities, is a key characteristic of the apparatus 80.

In the apparatus 80, the roller diameter end surfaces 102 and 105 are designed to become load bearing surfaces which slide on the opposed rail track and car groove surfaces and have sufficient surface areas for load bearing which are adequate for the designed tasks and contemplated loads. This shall become more clear in connection with the description of FIG. 22 and further description herein. The particular shape and nature of the attachment means 106 to make useful utilization of the car means 86 and rail track means 82 is not important other than it must be able to withstand load requirements. Thus the particular attachment means 106 is one of only several ways of making use of the advantages of the particular car means 86, roller means 100 and rail track means 82. In some heavy duty environments, the attachment means 106 may take the form (not shown) of two separated lugs 108 turned 90 degrees from that shown and cooperating spaced slots in the car means for affording connection of the spaced lugs to pin 114. However the instant attachment means 106 shown is simple, easy to manufacture, assemble and maintain and will be particularly useful when used in moderate sized equipment in a sailboat environment. Returning now to a more detailed description of the rail track means 82 and car means 86.

The rail track means 82, as shown in FIG. 6, has an X axis 128 and Y axis 130. It is formed with first and second spaced foot portions 132 and 134 which are parallel with the X axis. An internal chamber means 136 is formed in the rail track means 82 to define first and second internal shoulders 138 and 140.

The rail track means 82 is formed with parallel sides coextensive with its length to define a first roller engaging surface 142, a second roller engaging surface 144, a third roller engaging surface 146 and a fourth roller engaging surface 148, all of which are cooperable with the roller means 100 located in the car means 86 as shall be described. It will be noted that the surfaces 142 and 144 are in right angle relationship to each other, i.e. they form an included angle of 90 degrees. Side surfaces 146 and 148 are in mirror image relationship in geometric location around the Y and X axis relative to side surfaces 142 and 144. As shown in FIG. 6 with respect to side surfaces 142, 144, 146 and 148, a line drawn through the junction of side surfaces 146 and 148 on the one side and 142 and 144 on the other side (say the X axis) produces a pair of included angles ANA and ANB with respect to any axis parallel to the X axis, e.g. upper and lower included angle ANB and ANA. In the FIG. 6, the angle ANA and ANB are each equal to 45 degrees and ANA is inclined at 45 degrees from the Y axis also. It will be appreciated that while the angles ANA and ANB together must always equal 90 degrees, they may individually be in any larger or smaller than 45 degree relationship to any axis parallel to the X axis depending upon circumstances and needs. More particularly for example angle ANA could be 1 degree and angle ANB could be 89 degrees. In other words the sum must always equal 90 degrees but the disposition relative to the X axis of the rail track means 82 may vary widely. It will also be observed that the rail track means 82 is modular in that each half thereof around the Y-Y' axis is a mirror image relationship. This is advantageous in elimination of necessity for orientation of rail track means and car means. It is not a necessity of functionality.

The track rail means 82 has a top surface 149 which may be formed with an elongated depressed area or groove means 150 along the length thereof. A plurality of spaced through bores (not shown) may extend through the center of the groove 150 along the Y axis 130 to cooperate with bolts (and if desired, washers), the heads of the bolts (or the washers) will engage the internal shoulders 138 and 140 to clamp surfaces 152 and 154 firmly to the desired support for the rail means 82. For example this may be used to clamp the rail track means 82 to the deck of a sailboat. A variety of other ways of clamping the rail means and firmly fixing same to a support surface will be readily apparent, the key characteristics being that the position of surfaces 142, 144, 146 and 148 which engage the roller means 100 should not be interrupted. The through bores (not shown) in the groove 150 may also be used as aperatures to mount spring loaded plugs of adjustable stops.

The rail means 82 is well adapted for manufacture by a precision extrusion process. In the apparatus 80 as shown, there are critical dimensional relationships are between surfaces 142 and 144 and 146 and 148 both individually and to each other. Surfaces 142 and 148 are parallel each with the other and surfaces 146 and 144 are parallel each with the other. High precision extrusion of aluminum with dimensional relationship tolerances in the range of plus or minus 1/1000 of an inch is available commercially in most large cities at relatively low cost. The extrusion dies are relatively inexpensive. A variety of internal and external shapes as designed and desirable are available, the primary concern with the geometry being that sufficient stock in the body of the rail means 82 be provided to support the loads to be encountered on the surfaces 142, 144, 146 and 148 without deformation thereof.

After the extrusion has been made, it has been found advantageous, particularly when the extrusion is of aluminum, to put a high lubricity hard coating on the rail means. This hard coating with a high lubricity increases the density of the aluminum near the surface and is commercially available at a very reasonable low cost from several sources in the United States. This high density hard coating with high lubricity provides not only a protective coating, but allows relative movement and sliding action between it and the rollers means 100 with a minimum of binding or galling, even at high loads and with low wear characteristics. The high lubricity aspect of the coating preferably includes the deposition of polyfloratetraethylene into the interstices of the surfaces 142, 144, 146 and 148.

The car means 86 comprises a clam shell like body 156 as shown in end view in FIG. 8. It will be noted that the car means 86 of FIGS. 8 and 9 differ from that shown in FIGS. 1–5 primarily in that there is no cut out for an attachment lug. The car means 156 has X-X' axis 157 and Y-Y' axis 159 and a length ELA 161 shorter than length EL 84. The car means has sloping oppositely disposed upper sides 158 and 160 terminating in a top 162 which is parallel to the X-X' axis 157 and generally transverse to the Y-Y' axis 159.

The car means of FIGS. 1–5 has a cross slot 164 (see FIG. 2) which is formed in the top 162 in an essentially central location. The cross slot 164 has a pair of side walls 166 and 168 and the upper portion of a car body 156 of car means 86 is formed with a long axis through bore 170 which traverses the car parallel with the X axis and intersects the side walls 166 and 168 of the slot to mount the pivot pin 114 of the attachment means. The car means 86 is formed with a pair of external lower surfaces 172 and 174 which cant inwardly to define the outboard edges of the lower internal opening 176.

The car body 156 is formed in two mirror image halves 178 and 180 around the Y-Y' axis 159 (see FIG. 8). The body 156 is also well adapted for precision extrusion from aluminum which is then cut to a desired length ELA 161. After machining as shall be described, it is preferred that the body 156 be coated with a high lubricity high density hard coat similar to the rail track means 82.

It will be observed that opening 176 has a configuration generally similar in outline shape (as viewed in FIG. 8) to the outline shape of the rail track means 82 (see FIG. 6) which fits therewithin. The body 156 is of very sturdy construction and the opening 176 is slightly larger in dimension than the relevant dimension of the track means so that they do not touch, rather they ride on roller means 100.

Figure 5:
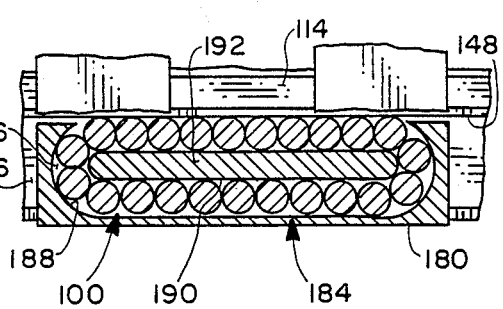
FIG. 5 is a sectional view along lines 5—5 of FIG. 3.

A pair of groove means 182 and 184 for receipt of the rollers 100 are formed one to a side 178 and 180 as seen in FIGS. 8 and 9. Each groove means 182 and 184 has a general shape of a rubber band (see FIG. 5) when viewed by rotation of the body 156 approximately 45 degrees from the Y-Y' axis orientation shown in FIG. 8. Each groove means 182 and 184 is in mirror image relationship to the other, is endless, and forms a 3-sided U-shaped channel, each side being in right angle relationship in cross section, for receipt of a plurality of rollers 100. As shown in FIG. 5, the groove means 184 is formed solely by removing metal (or plastic as the case may be) from the side 180, there being no "end caps" to the groove means 184. Alternatively, the car means 86 may be molded or sintered as a unitary body with the grooves therein.

The groove means may each be formed by machining the continuous roller track means 182–184 so as to leave the U-shaped or 3-sided groove, and each have a base 186 and a pair of spaced parallel outer and inner sides 188–190. The sides 188 and 190 are spaced apart a dimension slightly greater than the DIA 103 of roller means 100 and the base surface 186 which is transverse to sides 188 and 190 and is spaced from a groove island 191 outer surface 192, a distance slightly less than length RLE 101 of the roller means 100. Groove surface base 186 is coplanar throughout its length and is preferably parallel with surface 192. Base surface 186 is of less width at the area 186', the area 186' being the area where the rollers are being presented to surface 144 as shall be explained. The same groove or channel reference numbers of the 3-sided groove means have been applied to both the left hand side 178 of the car means shown in FIG. 9 and to the the rihht hand side 180 groove means 182 which is identical in mirror image. The outer groove side wall 188 is interrupted at the upper area of opening 176 and the inner groove side wall 190 provides a smooth rolling, continuous (non interrupted) endless surface to define the groove island 191 with outer surface 192. Each of the groove means 182–184 has rounded ends 194 and 196 defining terminal groove edges 198 and 200 so as to present the rollers 100 disposed therein into smooth rolling engagement with the second track surface means (such as 144 and 148 of FIG. 7) and to depart rolling engagement in endless movement without a sharp path change at the ends 198–200 of the groove means. It is important that the edges 198–200 are positioned in exquisitely precise relationship to the surfaces of the track means so that there is a smooth rolling transition or change of direction.

The geometry of the body 156 and opening 176 is arranged whereby the groove means 182 and 184 may be formed by a "single set up" machining operation in a computerized machine tool type apparatus wherein the path of the tool forming the groove may be caused to remove the material of the body without changing the position of the tool in any relationship to the body except for the plunge advancement into the body for depth of cut. Thus in a single "set up" and only changing the plunge of the cutting tool during movement around its metal removal path, high precision grooves are easily formed with low tolerance variation on modern machine tools. The rounded ends of the grooves 194 and 196 provide a high precision change of direction of the rollers in the grooves without the deleterious tolerance variations that can occur with assembly of end caps for obtaining direction change in the groove. The precision machining of the grooves 182 and 184 is the only precision machining required in the manufacturing, since the cross slot 164 is not particularly critical in its dimensional tolerances. The exact location of the terminal edges 198 and 200 for exit and entry of the rollers is very critical and out of tolerance edges can cause quick destruction of the roller means 100. The forming of a machined endless groove means 182 and 184 affords significant precision in roller/car/track relationships at an advantageous low comparative cost.

Figure 22:
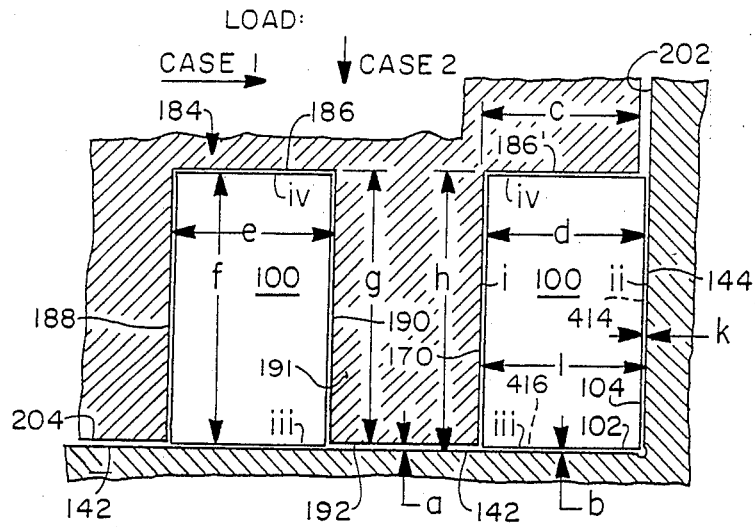
FIG. 22 is an enlarged semidiagrammatic view of portions of rollers, track surfaces and car surfaces of a single groove for purposes of indicating cooperations in various cases of load direction and required and critical cooperative and dimensional relationships for all grooves.

The critical dimensional relationships of roller means 100, rail track means 82 and either of the car groove means 182 and 184 is shown in FIG. 22 which illustrates the single quadrant loading capabilities of a track means such as 82 and car means 86, but is applicable to all quadrants. For purposes of initial discussion, it will be assumed that rail track surfaces 142 and 144 are the first and second surfaces of a rail track means and that surface 144 receives the roller surface 104 of the roller means 100 when the load is in direction of Case 1 and surface 142 received the load bearing engagement of end surface 102 of the roller means 100 when the load is in direction l. (If a roller has a shape such as that shown in FIG. 32, then the dimensions f, g, and h are considerably shortened and d is greater than f when this occurs, i.e. the surface 144 is still the roller surface for surface 414 shown in dotted lines, and surface 142 still is the roller end engaging surface for end 416 shown in dotted lines with no substantial changes in the relationships played by three sided groove surfaces 186, 188 and 190 except that the sliding surface area 416 is quite large.) The discussion will be in terms of a single groove means such as 184 in side 178 of the car means 86 groove means 184 opening both to internal chamber 176 surfaces 202 and 204 (see FIG. 8). The same discussion applies also to groove means 182 in side 180 and to the groove means in the alternate embodiments, however it will be understood that the orientation will be rotated from that shown. The FIG. 22 can be considered generic as to relationships.

Also as shown, the loads are considered for only the two right angle directions in a single quadrant of the four direction loading possibilities, i.e. loads that are shown as Case 1 and Case 2. For four direction loading, obviously there is need for another groove means/roller means/track means, etc. in opposition to that shown. For very high precision it is preferred that only the roller surface of the rollers is loaded, the diameter end surfaces of the rollers only coming into engagement use as a sliding engagement in an unusual and unexpected shock situation which overwhelms the spring loading means operating on the roller surfaces as shall be described. This ability to withstand shock without damage s still important in some field use.

The dimensional relationships of the roller surfaces 142 and 144' of the rail track means that are directly engageable with the rollers 100 is such that the track surface 142 opposite the groove island 191 surface 192 and the endless base 186 of the three sided channel like groove means 184 generally is larger in width size W/B94 than that of the width of surface 144 W/A92. This is true in almost all cases unless the dimensions of the roller means is exaggerated to the extent that the diameter DIA 103 is so small relative to the length RLE 100 that the cross sectional width of an entire groove means (bisecting the groove means through the island 191 at the mid section) is less than that of the width W/B94 or an exaggerated disc of the type shown in FIG. 32 is used. If the roller means 100 length RLE 101 becomes very small and the diameter DIA 103 becomes very large, then the surface 142 that is opposite base 186 of the groove means 184 may be smaller than the surface 144, always assuming that the groove means dimensions of surfaces 186, 188 and 190 are complimentary and in the relationship shown in FIG. 22.

The surfaces 142 and 144 that are engaged by the roller means 100 should be uninterrupted to prevent damage to the rollers. In FIG. 22, the arrangement of parts and relative dimensional relationships of the car surfaces, groove dimensions and the complimentary dimensions on the rail surfaces are shown in relative relationship to each other by formula, it being understood that the tolerances are held quite close. In the assembled relationship of FIG. 22:

a = a variable range of positive dimensions above 0 and is the dimension between island groove surface 192 and rail track surface 142 (note, surface 204, the non working or non roller engaging portion of the rail track is usually but not necessarily coplanar with surface 192);

b = the variable range of dimensions between roller surface 102 and surface 142 of the rail track means which may range between 0 and a positive value, as shown in dotted lines, may be the dimension between surfaces 104 of a roller means 100 and rail track surface 142 when disc shaped roller of FIG. 32 is used;

c = the dimension of the base 186' of groove means 184 transverse to the long direction thereof at the area of presentation of the rollers 100 to surface 144 of the rail track means (see right hand area of FIG. 22) and where the base 186' is less than the width of the groove base 186;

d = the dimension 102 of the roller means, here shown in the DIA 103 dimension but which may be the roller RLE dimension 101 as shown by dotted line 104 if the rollers of FIG. 32 are used;

e = the distance between the side walls 188 and 190 transverse to the long dimension thereof taken at an area of the groove means 184 remote from the presentation area of the rollers to surface 144, it also being the width dimension of the base 186 at right angles to both side walls 188 and 190;

f = the length RLE 101 of roller surface 104 of roller means 100 when the roller means is of the type shown in FIG. 10 (and may be the diameter DIA 103 of the end surface 102 as shown in dotted lines when the roller means 100 is of the type shown in FIG. 32).

g = the dimension between groove island surface 192 and the base of the groove in both areas 186 and 186', and is the depth of the groove means 184;

h = the dimension between the base 186 and 186' (both areas) of the groove means 184 to the surface 142 of the rail track means;

k = a range of distances from 0 to a positive dimension between roller surface 104 and surface 144 of the rail track means (and as shown in dotted lines between surface 102 and surface 144 when a disc like roller is used);

l = the dimension between groove wall surface 190 in the area of the groove means where the roller means 100 is being presented to surface 144;

(i) = a working roller bearing surface, namely the groove wall 190 in the roller presentation area of the groove means where l is measured as shown in the right hand portion of the figure;

(ii) = a working roller bearing surface of track 144 at the area opposite bearing surface i where the dimension l is being measured;

(iii) = a working bearing surface of the roller means immediately adjacent to and opposite surface 142 of the rail track means which is also a working surface;

(iv) = a working bearing surface of the roller means immediately adjacent to and opposite to the continuous base 186-186' of the groove which is also a working bearing surface.;

Case 1 = the situation where load is in a direction from the left and toward the right as viewed in FIG. 22;

Case 2 = the situation where the load is in a direction from the top toward the bottom as viewed in FIG. 22.

When a load is directed at surface 142 of the apparatus shown in FIG. 22 from a direction in an arc of between 270 and 360 degrees, (with the top of figure being 360 degrees) the structure will cause the bearing surfaces i, ii or iii, iv to come into working load bearing relation, depending on where the load is directed. The geometry of the relationships of the rollers, grooves and working rail track surfaces causes retention of all parts in assembled relation independent of the direction of load in arc of 270-360 degrees without additional parts. Note, in several of the embodiments (FIGS. 1, 13, 13A, 16, 16A, 28, 30, 31, 33, 34, 35 and 45) there are only three piece parts to inventory aside from mounting for the fixed member and attachment means for the moving member.

The relationship of the parts in apparatus 80 is that the car means surfaces never touch the rail track means surfaces during relative motion and the rollers are load bearing in various directions of load, all with great simplicity yet with a high precision/low cost ratio.

In Case 1, the bearing surfaces i and ii (190 and 144 respectively) of the car means and the track means will rollingly and bearingly engage surface 104 on opposite sides thereof. This occurs when the relationship of the roller means is as shown in FIG. 1 with a low diameter to length ratio of the roller means. It will be the same roller surface 144 shown in dotted lines when there is a large diameter to length of roller relationship with height dimensions f, g and h shortened. In all events under load case 1, as shown from the 270 degree direction, the relationships will be as follows: $h=a+g$; h is greater than f; $l=k+d$; $k=0$; f is greater than g; $h=f+b$; a is greater than b; d is greater than c; and e is greater than d.

When load is as shown in case 2 from the 360 degree direction, the end surfaces iii and iv of the roller become the load bearing surfaces together with their adjacent car and track surfaces. This relationship holds where there is a ratio greater than one of length to diameter of the rollers and less than one. In load case 2, the relationships are the same with respect to the other dimensions discussed with respect to case 1 except that $f=h$; $b=0$; and $k=a$ range of positive values above 0. The 0 dimension of k may occur in case 2 only in a non load sense. The roller surface may touch the rail track surface because the roller is "floating" in a non working or load bearing way in the groove between surfaces 190 and 144.

The orientation of the car and its groove means and the rail track means shown in FIG. 22 may be oriented in an infinite number of rotational locations from that shown in FIG. 22. Also the interior, exterior relationships may be reversed. Several different relationships may occur from quadrant to quadrant when multiple grooves are used. Mirror image relationships may occur. Some of these different orientations shall be discussed and shown in the following alternate embodiments.

FIGS. 11 and 12 show an alternate embodiment of rail track means 82a. The alternate embodiment shall have reference numbers similar to those used heretofore with the addition of the suffix "a" for similar parts and relationships. New parts or relationships will have new reference numbers.

The rail track means 82a is essentially similar to a doubled up back to back version of the rail track means 82 with two rail track means 82 placed with the foot surfaces 152 together and the internal chamber 136 becomes a central cylindrical smooth sided bore 206. Importantly, track rail means 82a is well adapted for high precision extrusion. The bore 206 when the extrusion is of aluminum is formed with a very smooth surface finish and is well adapted, after a high lubricity hard coat aforedescribed is applied, to be a chamber wall for sealingly engaging an O ring of an air piston as shall be described. Also, as shall be described, the bore 206 may serve as a dust free chamber for other moving parts.

The track means 82a with appropriate car means is particularly useful in machine tool types of equipment or other industrial use equipment needing high precision such as X,Y,Z mechanisms. For example it does find use in high precision versatile computer controlled dispensing apparatus as shown in the copending application assigned to the same assignee entitled METHOD AND APPARATUS FOR PRECISION SQUEEZE TUBE VALVING, PUMPING AND AND DISPENSING OF WORK FLUID(S) filed Feb. 21, 1989 and having Ser. No. 313,389. The rail track means 82a is formed with lower track surfaces 208, 210 and 212, 214 on opposite sides of the Y-Y' axis as shown in FIG. 11. The track surfaces 208, 210 and 146a, 148a are in mirror image symmetrical relationship around the X-X' and Y-Y' axis, as are oppositely disposed track surfaces 212-214 and 142a-146a. Further surface 212 is parallel with surface 210, 144a, and 146a and surface 214 is parallel with 208, 142a and 148a. The groove means 150a on both the top and bottom of the track means 82a are essentially to remove unneeded material for weight reduction and to afford areas for location of other parts for cooperation with the car means or mounting, etc., as shall become apparent.

Figure 13:
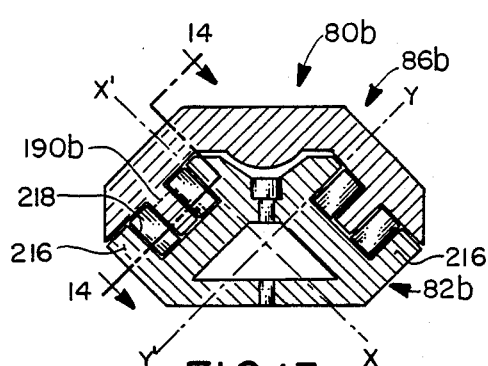
FIG. 13 is a sectional view of an alternate car and rail track means assembly.
Figure 14:
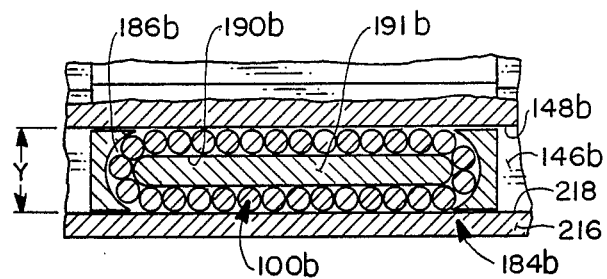
FIG. 14 is a sectional view along lines 14—14 of FIG. 13.

The embodiment of apparatus 80b shown in FIGS. 13 and 14 has parts similar to those aforedescribed and similar parts shall be identified with similar reference numbers with the addition of the suffix "b". The rail track means 82b is similar to the rail track means 82 with the addition of a pair of upstanding lugs 216 which defines track roller surfaces 218. Only one surface 218 of groove means 184b will be described, namely surface 218 located in oppositely disposed relation to upper rail track surface 148b. Surface 218 has a similar width dimension to surface 148b for engagement with the roller means 100b when the load is from the top toward the bottom as viewed in FIGS. 13 and 14. The dimension Y between surfaces 218 and 144b must be greater, but only 5 to 10 thousandths of an inch greater, than the sum of the vertical dimensions of the two roller means 100b disposed in groove means 184b as shown in FIG. 14 plus the thickness of the groove island 191b (measured vertically). Thus, when the load on apparatus 80b is subjected to loads coming from the X'-Y quadrant shown in FIG. 13, the surface 218 becomes the bearing surface and surface 144b does not have load bearing relationship with the roller means 100b. The reverse is true when the load is from the X-Y' quadrant. It is important that the roller means 100b never be simultaneously under load on surfaces 218 and 144b. No simultaneous contact except for accidental floating contact may be permitted since this would cause the rolling contact to be in opposite directions. While the apparatus 82b has some positive characteristics, it does have a slight disability of the lug 216 being capable of trapping loose debris when it is disposed in horizontal aligned arrangement on the deck of for example a sailboat. It has the advantage of rolling contact between car and track on a single side type track, when loads are from the X'-Y quadrant shown in FIG. 13.

Figure 13A:
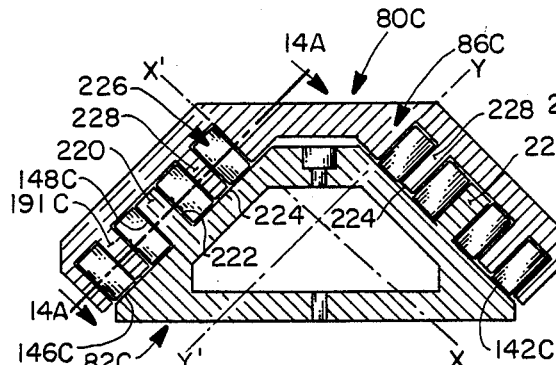
FIG. 13A is a sectional view similar to FIG. 13 showing another alternative form of car and rail track means assembly.
Figure 14:
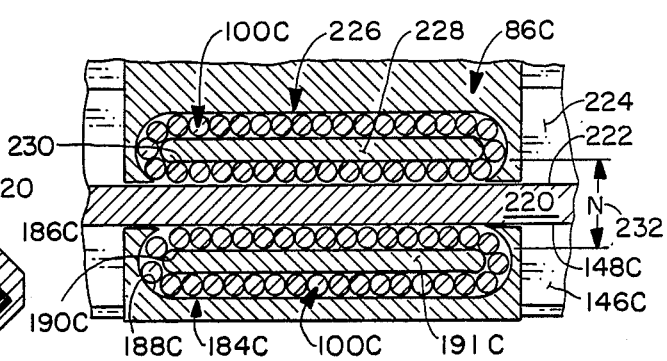

The embodiment 80c shown in FIGS. 13A and 14A has parts similar to the aforedescribed parts which will be identified with a suffix "c". The apparatus 80c comprises modified rail track means 82c formed with a pair of upstanding side wall central lugs 220 formed in each side of the lower portion thereof. The track means 82c lower portion defines rail track surface 147c and the side wall 148c surface of the lug 220 are similar in character to the rail track shown in FIGS. 1–7. Each lug 220 on each side of the track means is in mirror image relationship. Only one lug 220 shall be further described. The track means surface 224 is in a coplanar relationship to the lower track surface such as 146c and similarly on the other side of the rail track means, will also be coplanar with surface 142c. An upper groove means 226 is formed in car means 86c to present roller means 100c therein for cooperation with lug side surface 222 in reversed array from that shown in the lower half of the apparatus 80c. The dimension N232 between the continuous wall surface 230 of the groove island 228 of the upper groove means 226 and the similar wall surface 190c of the lower groove means 184c, as shown, is greater than the thickness as measured vertically in FIG. 14A, of the sum of the height of the two rollers and the thickness of lug 220. Thus the rollers in the upper groove means 226 are not in load bearing engagement on surface 222 when the load is from the direction of Y' and the roller means 100c in lower groove means 184c is not engaging surface 148c when the load is from the Y direction of FIG. 13A. Simply put, the upper and lower groove means 226 and 184c are so arrayed that the roller means 100c in the two groove means do not simultaneously engage the opposite side walls 148c and 222 of the lug 220, although this is not operationally critical since the rollers can simultaneously move in opposite directions in each groove means.

Figure 15:
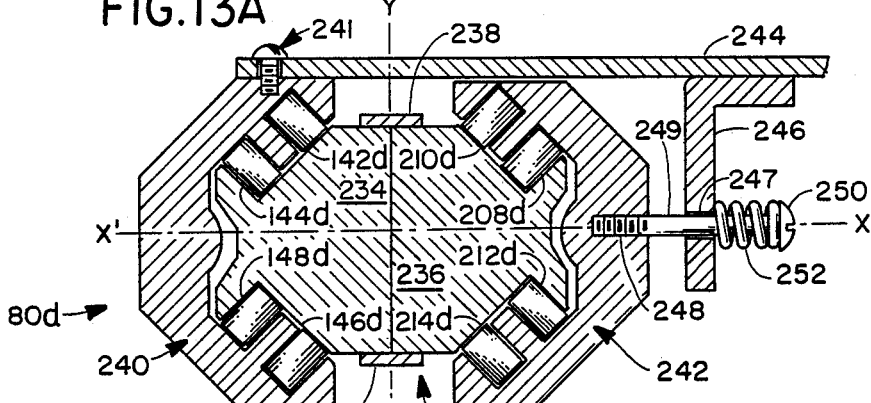
FIG. 15 is a sectional view of an alternate form of apparatus, where the rollers are adapted to be put in loaded condition against the rail means.

The embodiment of apparatus 80d shown in FIG. 15 has many similarities to those aforedescribed. Similar parts shall use similar reference numbers with the suffix "d". The apparatus 80d is to be considered semidiagrammatic in a sense to illustrate one form of rail track means usable in a portion of machine tool devices on one of the axis. More particularly the bed or base axis of a multi-axis device usually has need for the greatest precision movement since any tolerance variation is transmitted to all other aspects and mechanisms on the other axis. Thus the bed rail track means 82d may have the roller engaging side surfaces spread apart a considerable distance on the X-X' axis (much more than shown in FIG. 15). The rail means 82d is similar to rail means 82c shown in FIG. 11 when rotated 90 degrees except that there may be no use for a bore equivalent to bore 206. The left half of the rail means 234 is fixed to the right half in mirror image relationship by any suitable means such as welded strips 238. Also, in practice, the rail means halves 234 and 236 may be formed from a single piece of bar stock (extruded or machined) with the halves 234 and 236 being integral with each other and the rail surfaces 208d, 210d, 142d, 144d, 148d, 146d, 214d and 212d.

The car means for the apparatus 80d comprises a left hand car means 240 and right hand car means 242 which cooperate with each other and each of which is similar to that shown in FIG. 8. The left hand car means 240 is here shown fixed to plate 244 through suitable attachment means 241 such as the bolt shown. The plate 244 has a depending lug 246 fixed thereto and a bore 247 therein. Right hand car means 242 has a threaded bore 248 aligned with lug bore 247. Mounted in bore 247 is a bolt 249 with a shaft diameter smaller than bore 247 and a head 250 larger than bore 247. The end of bolt 249 is threaded for threaded cooperation with car bore 248 as shown. A compression spring 252 surrounds the shaft of bolt 249 and biases head 250 outwardly when compressed between the lug 246 and the bolt head 250. The right hand car means 242 is attached to plate 244 only through bolt 249. The spring 252 in turn biases left hand car 242 to the right as shown, which in turn biases car 242 to the right, the face of the spring then causes the rollers on all four track surfaces 144d, 148d, 208d and 212d to become loaded. In the apparatus 80d, the cars 240 and 242 may be fixed and the rail means 82d may be movable although the reverse is also true as shown in FIG. 21 to be described. The rollers 100d are loaded on the rail means at any desired adjustable load so as to not distort the shape of the rollers and so that all rollers are loaded but will still move easily. More than one loading bolt/spring arrangement such as shown may be used, particularly if the cars have an appreciable length. However, it will be noted again that a very simple easy to adjust loading mechanism is used, and very high precision results have been obtained. The general scheme has found use in apparatus of the type shown in FIGS. 17–21 as further described.

Figure 16:
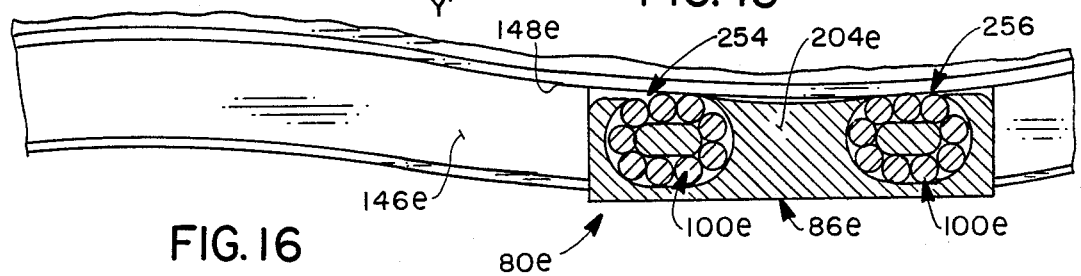
FIG. 16 is a view, partially in section, showing another alternate form of car and rail means showing versatility of use of some of the inventive concepts.
Figure 19:
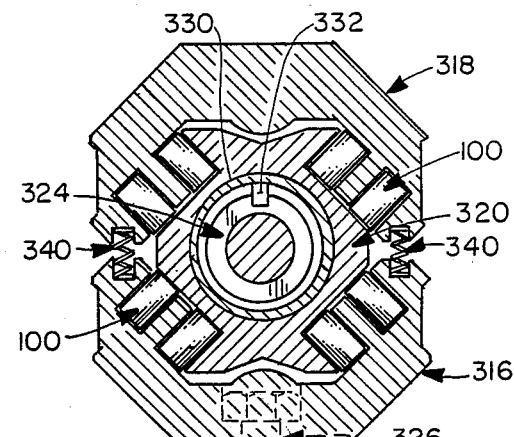
FIG. 19 is a sectional view through lines 19—19 of a portion of FIG. 18.

The embodiment of apparatus 80e shown in FIG. 16 has similarities to the aforedescribed and similar parts will be similarly identified with the suffix "e". As shown in FIG. 16, the embodiment illustrates two additional variations. First there may be occasions when it is desired to have more than one groove means formed in the surface 204e in parallel aligned array for coaction with the surfaces 148e and 146e. As shown the car groove means 254 and 256 may be short so as to present one or only a few rollers for rolling and/or end engagement with rail track surfaces 148e and 146e. This is particularly true when a rail track means is sinesoidal or of moderate irregular curvatures. Where straight track side surfaces are employed on the rail means, it has been found that parallel grooves 254 and 256 which present several rollers for load bearing are advantageous where large load capacity is desired (for example 2 parallel car grooves 254 and 256 presenting 12 rollers such as shown in FIG. 5). It is also advantageous when spaced groove means are required to provide widely spaced bearing areas, for example when car means of the type shown in FIG. 19 are employed. The short length of grooves illustrated in FIG. 16 have a comparatively light load bearing capability but may be advantageous as compared to the point contact of a ball bearing.

Figure 16A:
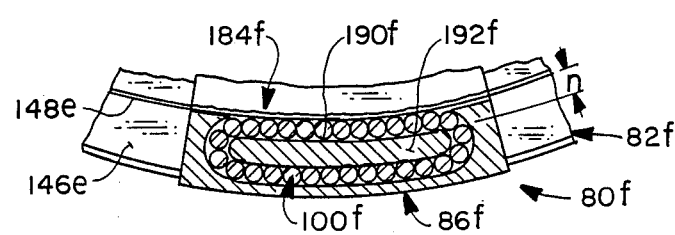
FIG. 16A is a partial sectional view showing an apparatus using an alternate form of the invention.
Figure 17:
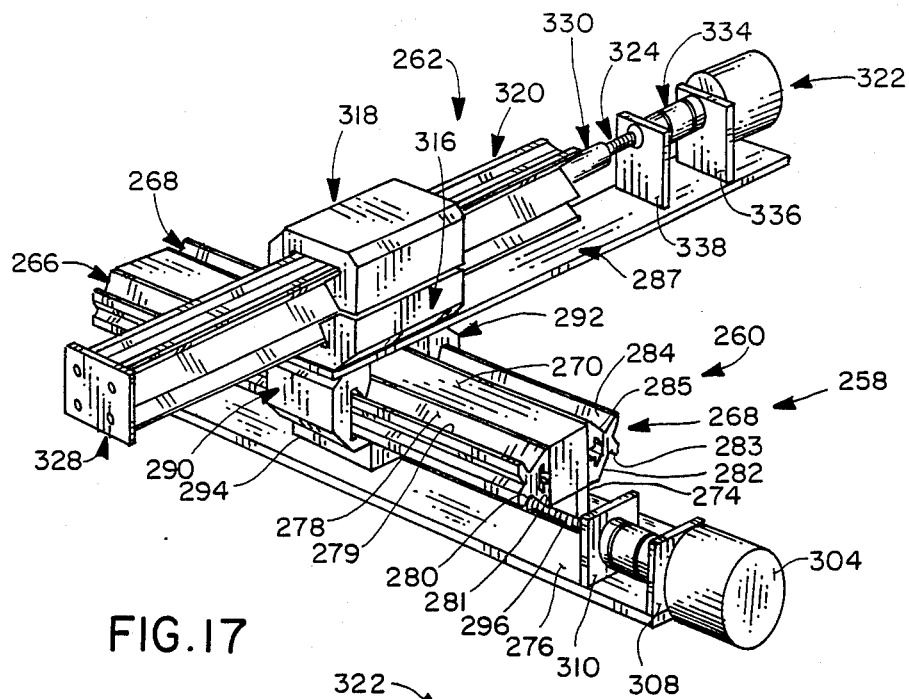
FIG. 17 is a perspective view of an X Y apparatus utilizing two cars and tracks embodying some of the inventive concepts.

The apparatus 80f shown in FIG. 16A is similar in certain respects to the aforedescribed and similar parts shall be described with the addition of the suffix "f". In this embodiment 80f, the rail track means 82f has a constant curvature with surface 148e. The groove means 184f formed in car means 86f is formed with a curvature about the same geometric radius as surface 148e. The curvature of surface 190f is the same curvature of rail track surface 148e so that surface 148e and surface 190f are concentric and spaced apart as aforediscussed with respect to FIG. 22 so as to trap the roller means 100f for movement therebetween. When modern computer controlled machine tools are used to make the curved surface 190f, it is at no substantial additional set up or manufacturing cost as compared to car means 86 of FIG. 8.

Figure 20:
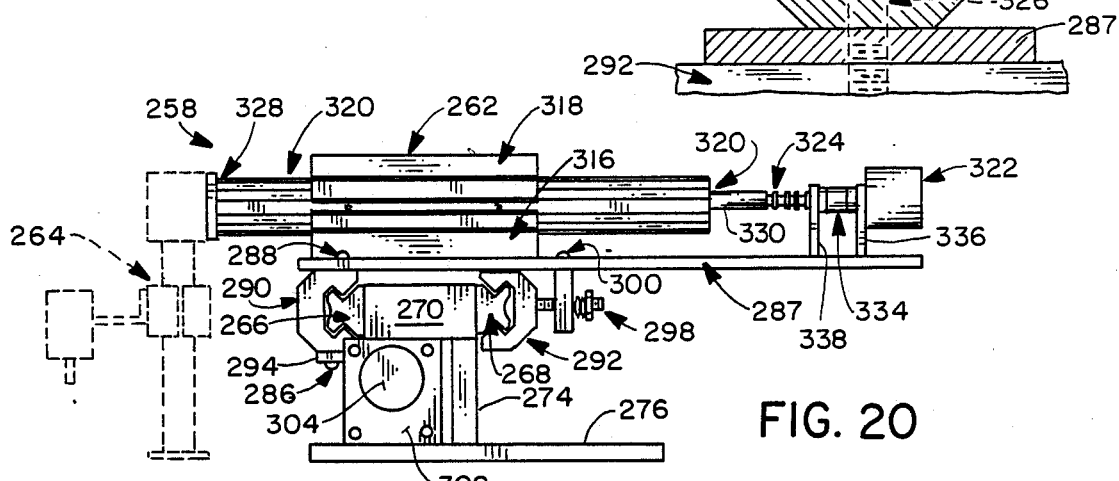
FIG. 20 is a side elevational view of the device shown in FIG. 18 with an alternate Z axis mover being shown in dotted lines in the lefthand portion of the figure.
Figure 21:
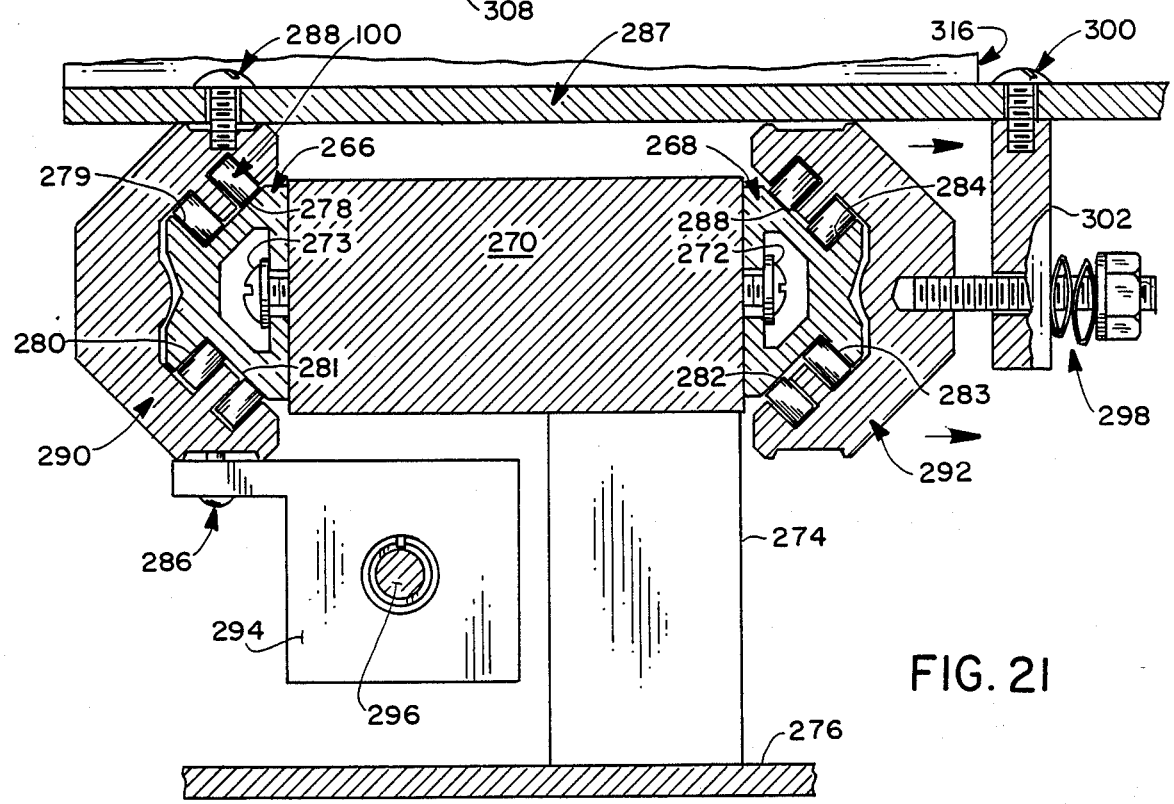
FIG. 21 is a sectional view along lines 21—21 of FIG. 18.

In FIGS. 17 through 21 there is illustrated a precision X-Y apparatus 258 and in FIG. 20 a Z axis tower means 264 is shown semidiagrammatically in phantom dash lines. The X axis means 260 and Y axis means 262, as shown in FIGS. 17–21, when incorporated with an up down or Z tower means 264, may further be a part of a sophisticated programmable XYZ mechanism. The electrical and electronic circuitry for such an apparatus 258 and the details of the CPU indexer, driver, stepper motor, software, proximity switches and other sensors and relationships with other components, work pieces, work piece movers, etc. are explicated in the aforementioned copending application entitled METHOD AND APPARATUS FOR PRECISION SQUEEZE TUBE VALVING, PUMPING AND DISPENSING OF WORK FLUIDS having Ser. No. 313,389, filed the 21st day of February, 1989 of which I am a co-inventor.

When the car means and rail trace: means of the type aforedescribed herein are used in this sophisticated type apparatus 258, all operations are usually controllable by a CPU (not shown), as described in the copending application. When the CPU is properly programmed with appropriate software, the movements on this X - Y and Z axis may be coordinated with other operations and movements. It is noteworthy that described in the aforementioned copending application is programmable high precision rotary movement (up to 50,000 discrete programmable steps per revolution) that may b translated into tiny increments of reciprocal linear movement of the X axis means 260, Y axis movement means 262 and Z tower means 264 in any desired simultaneous or sequential movement profile including duration, stop, forward and reverse. The rotary movement of the operator (here stepper motors) can be reliably and repeatably translated into very low tolerance repeatable linear movement, however, the usefulness of this programmable precision of the operator is not practical for field use if reliable relative movement of a car or the like to a rail is not available. The apparatus here shown as 258 does provide high practical field use precision.

In the apparatus 258, the X axis motion is provided along spaced X axis rail surface means 266–268 which cooperate with a pair of movable X axis roller bearing block means 290 and 292 which are spaced apart and fixedly mounted to traveler block means 294 there below.

The spaced rail track means 266 and 268 are fixed to a track bed plate 270 which in turn is fixed to upstanding frame member 274 fixed to base plate 276. The left hand rail track means 266 may be fixed to block means 270 by suitable bolts and washers 273 and the right hand rail track means 268 may be similarly mounted by bolts and washers 272 as shown in FIG. 21.

The left hand track rail means 266 and right hand rail track means 268 may be formed integral with block 270 by extrusion or machining. The left hand rail track means is formed with rail track surfaces 278, 279, 280 and 281 which correspond to surfaces 142$d$, 144$d$, 148$d$ and 146$d$ respectively of the rail track means 82$d$ of FIG. 15. Rail track surfaces 282, 283, 284 and 285 correspond to FIG. 15 surfaces 214$d$, 212$d$, 208$d$ and 210$d$.

The left hand car means 290 is similar to car means 86 of FIG. 8 rotated 90 degrees and is formed with groove means identical to those discussed in FIG. 8 for receipt of the roller means 100. The right hand car means 292 is of the same construction as the left hand car means 290 and when assembled is in mirror image relationship thereto. The cooperation of the rail track means 266–268 roller means 100 and car means 290-292 is as aforediscussed, there being a slightly different form of roller loading means 298 employed in this apparatus 258 which is attached to right hand car means 292 whose operation is obvious from the drawing FIG. 21. The roller loading means 298 cooperates with the depending plate 302 mounted to plate 287 by suitable fastening means 300. The roller loading means 298 biases right hand car means 292 (and thus the left hand rail track means 266 through plate 270 and the roller means 100 in the car means) toward depending plate 302 mounted to plate 287. The loading means 298 is substantially identical to that shown and discussed with respect to FIG. 15 except a different spring means is used and the head is screwed down to adjust bias.

The left hand car means 290 is mounted to traveler block 294 which is of the high precision type that serves as a ball of the precision screw 296 by suitable means such as bolts 286. The traveler block means 294 is movable relative to base 276, cooperates with precision screw means 296 and moves the X axis mover means 258 through the programmable motion of the stepper motor 304. The stepper motor 304 is powered and programmed as described in the previously described copending application. The stepper motor 304 drives the precision screw 296 through a connection means 306 located between spaced mounting plates 308 and 310. Proximity switch 312 and limit switch 314 are shown only in FIG. 18. They are advantageous to establish home or reference positions (and overtravel positions) of the car means 290 and 292 for programmable movement. Similar proximity and limit switches may be used (but not shown) on each of the X, Y and Z axis.

The car means 290-292 are fixed to Y axis plate means 287 through the bolts 288 and 300. Thus both the Y axis plate means 287 and the oar means 290–292 are relatively movable as a unit to the X axis frame plate means 276 by the stepper motor 304. It will be seen that movement of plate 287 is very stable since the car means 290 and 292 are widely spaced for riding on the fixedly mounted spaced rail means 266–268 which are in turn fixedly mounted on plate means 270. The arrangement described, using a high precision screw, helps provide the repeatable stable high precision movement of the XYZ apparatus. One precision screw means 296 and precision traveler means 294 that have been found suitable for high precision movement are those sold as Model R-505 manufactured by a division of the Warner Electric Brake Company of South Beloit, Ill.

The Y axis mover means 262 comprises the Y axis plate means 287, the lower car means 316, upper car means 318, rail track means 320, stepper motor means 322 and precision screw means 324. The car means 316 may be fixedly mounted to Y axis plate means 287 by suitable bolt means or the like 326 shown in dotted lines in FIG. 19. The lower car means 316 when fixed to plate means 287, mounts the entire Y axis mover means 262 (car means 316-318, rail track means 320, stepper motor means 322 and precision screw 324) for movement as a unit. The rail track end means 328 of the rail track means for mounting other apparatus is relatively movable to the car means 316–318 by stepper motor means 322 through a special traveler mechanism 330 having a special race 332 (see FIG. 19). Here the end means 328 is oppositely disposed to stepper motor means 322. As shown the Y axis has the rail track means 320 that move relative to plate 287 and the car means is fixed relative to plate 287. The precision screw means 324 and traveler 330 with special race 332 are also available from the aforementioned Warner Electric Brake Company. The traveler 330 is tube like in character and fits within and is fixed to the internal track chamber 206. (Also see FIGS. 11 and 12 and FIG. 19.) The traveler 330 is fixed to the track means 320 so that the race means 332 will advance and retreat the track means on the car means 316–318 upon rotation of screw means 324 by the stepper motor means 322 through the connection means 334.

Figure 18:
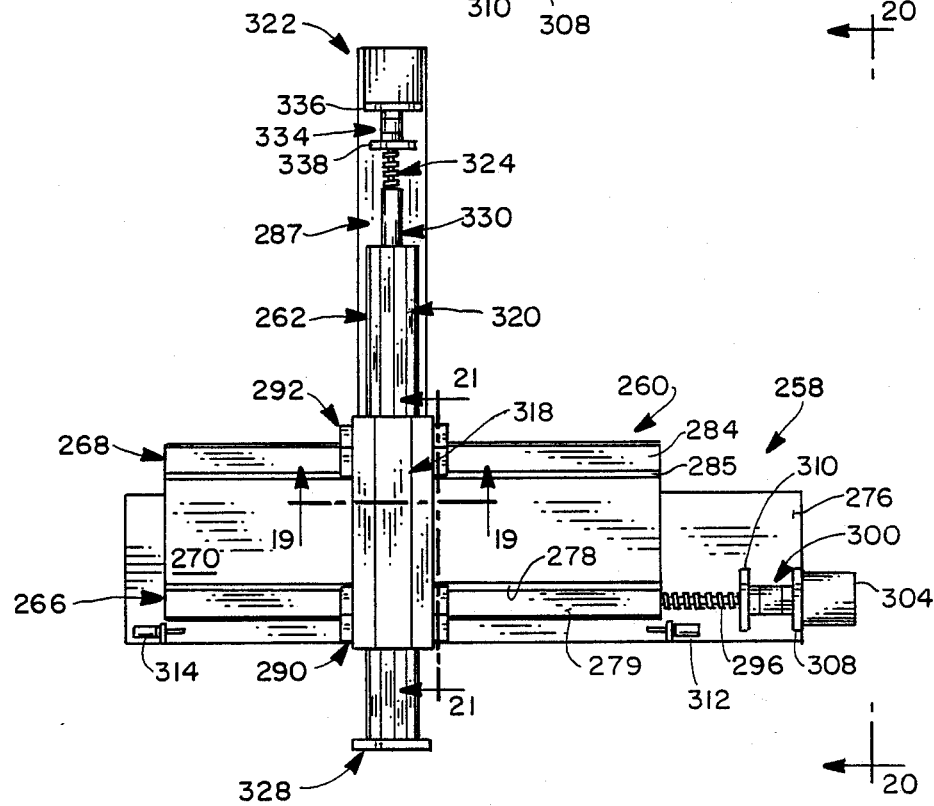
FIG. 18 is a top view of the apparatus shown in FIG. 17.

The track means 320 is approximately twice the length of the car means 316–318 as viewed in top view FIG. 18. The car means 316–318 as shown are two cars in mirror image relationship and each of the type shown in FIGS. 8 and 9. To be noted is that the car means 316 and 318 may be even longer in relationship to the rail track means 320 and formed with a pair of groove means (as shown in FIG. 16, only each will be longer) to provide additional stability to the movement of the rail track means. The car means 316 and 318 have the rollers thereon loaded by suitable biasing spring means 340 (see FIG. 19), there usually being at least a pair of such biasing means on each side of the assembly.

The Z tower means 262 shown in FIG. 20 may be of the type, for example, as shown in FIG. 48, essentially an air operated up/down tower to be described and without the base thereon, or of the computer stepper motor driven type shown and described in the aforementioned copending application, Ser. No. 313,389, filed Feb. 21, 1989, having complex movement profile characteristics, or other suitable Z tower types. Because it is located on the mounting end 328 it will preferably be of the least mass possible to meet application needs and any applicable cost constraints. The X axis mover means 260 and Y axis mover means 262 provide a significant cost/precision advantage to high precision X/Y and X/Y/Z mechanisms when using the car/track-/roller mechanisms and concepts described versus other precision devices commercially available such as Thompson rods. Also the total mass of the described type of mechanism is greatly reduced per equivalence in precision as compared to known prior art devices. The entire apparatus 258 may be manufactured using hard coated aluminum with lubricity characteristics previously described, excepting the precision screw/ball mechanism, connector means and stepper motor means which ar purchased off the shelf items and also the roller means which are preferably made of hard plastic. In the apparatus 258, the roller surfaces of the roller means 100 in the four grooves in the car means 316–318 bear the load except for an unexpected and non normal force on the apparatus which overcomes the bias of loading biasing means 298 or 340 or both. In this event the end surfaces of the roller means would take the load and absent a very extreme force, would allow the apparatus to not be damaged even if the force occurred while there is relative movement. Also it will be appreciated that even when there is unexpectedly destructive force, it will usually result in damage to the rollers 100 which are very inexpensive (on a comparative basis to the rest of the apparatus) and which may be easily replaced.

Figure 23:
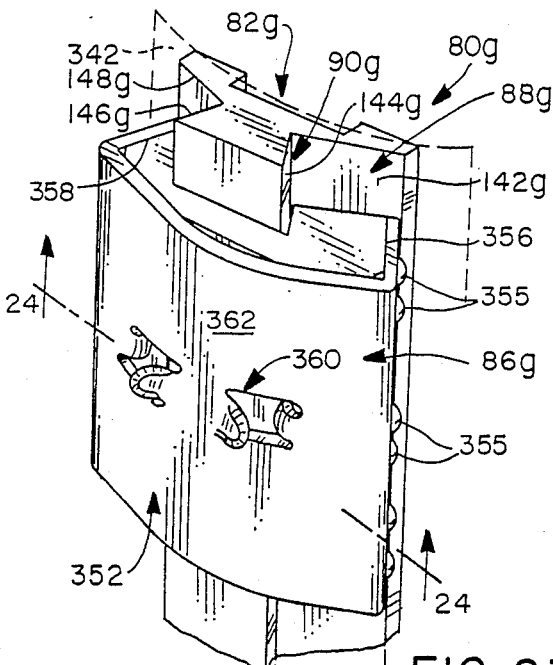
FIG. 23 is a view in perspective showing an alternate embodiment of apparatus embodying the inventive concepts.
Figure 24:
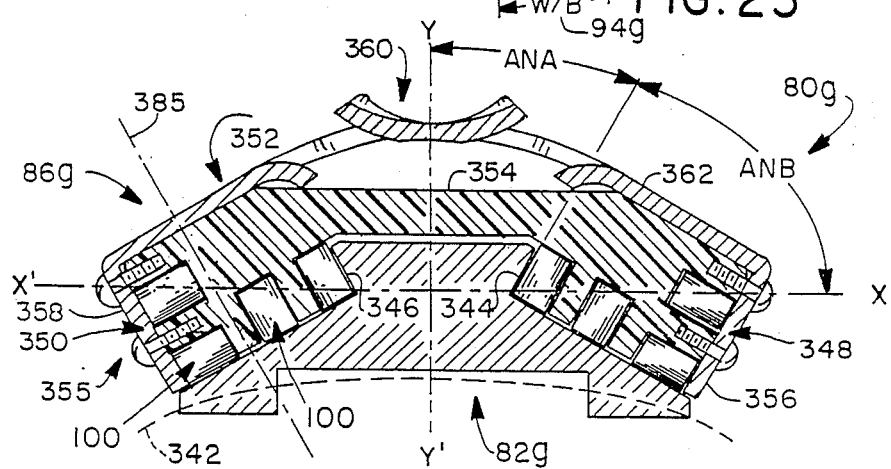
FIG. 24 is a sectional view along lines 24—24 of FIG. 23.
Figure 24A:
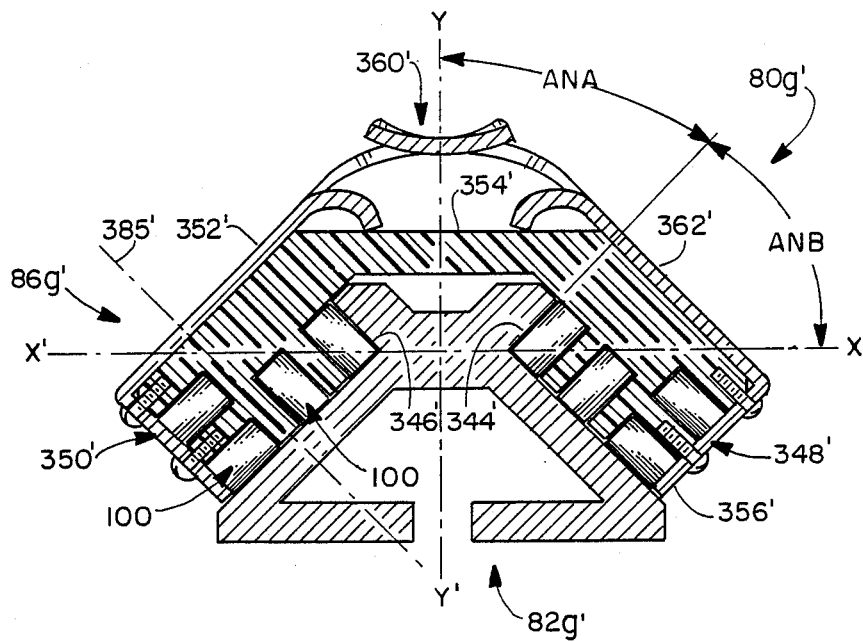
FIG. 24A is a sectional view, similar to FIG. 24, showing an alternate embodiment using a track means similar to FIG. 6.

The apparatus 80g shown in FIG. 23 and 24 has many similar parts and cooperation to those shown in FIGS. 1–16 and similar parts will be identified with the same reference numbers and the suffix "g". The apparatus 80g illustrates a relatively inexpensive but heavy duty and strong car means 86g for cooperation with a rail track means 82g which has a very low height to width ratio as viewed in FIG. 24. This low height to width ratio may be advantageous in some usages, for example when used on a mast 42 where there may exist a desire for low profile of the rail track means The apparatus of FIG. 24A is identical to that shown in FIG. 24 except that the angles ANA and ANB are identical with consequent angularity changes in the parts. The apparatus of FIG. 24 have angles ANA and ANB differing. They will be described together with the same reference numbers with apparatus 80g of FIG. 24A being primed. Also, after discussion of FIG. 26, the apparatus of FIG. 24A will be further discussed.

The two piece car means 86g has a first part that may be formed of a thermosetting resin such as Vectra and may be molded in one piece with four car groove means 344, 346, 348 and 350 having characteristics similar to the characteristics set forth heretofore with respect to groove means 182 and 184 except that groove means 348 and 350 are disposed at right angles to groove means 344 and 346 respectively as shown in FIGS. 24 and 24A. Note that rail track surfaces 142g–148g have a width W/B948 that is substantially wider than width W/B94 shown in FIGS. 1, 6 and 7. The orientation of one side of the car rail track surfaces 142g and 144g to each other are still held at 90 degrees as are surfaces 148g and 146g. Each of the rail track means 88g–90g are in mirror image relationship to the pair on the other side of the car, but are not oriented with angles ANA and ANB, being equal between the X and Y axis. The angles of the rail track surfaces to the axis in the embodiment shown in FIG. 24 has ANA less than ANB and it will be noted that all track surfaces are located above the base within an arc of 180 degrees which is true of the embodiment of FIG. 24A.

The outboard groove means 348–350 on the opposite sides of the car means 80g of both that of FIGS. 24 and 24A are designed and arranged so as to present roller surfaces of the roller means 100 (as distinct from end surfaces) to the rail track means adjacent thereto. This relationship is true of the cooperation of groove means 344 and 346 with the respective rail track surface means 144g and 146g. Thus very substantial load bearing capability at low cost when forces are omnidirectional and there will be roller surface contact when the load is from any of the four quadrants.

The particular embodiment 86g of FIGS. 24 and 24A has a combination car means cover, roller retainer and attachment means 352 attached to the plastic portion 354 of the car means 86g which serves all of these functions. The means 352 also adds significant strength to the assembly and may be mounted to plastic portion by any of several means such as fasteners 355.

The fasteners are mounted through the cover to portions of the plastic body in a manner which doesn't interfere with the roller means 100 in the groove means 348 and 350. The means 352 retain the roller means 100 in the outboard groove means 348–350 in the assembly through depending flanges 356–358, and is formed with an attachment means 360 for working with other parts (not shown) and is located in the top portion 362 thereof. The attachment means 360 may take many forms a desired for usefulness, and may be connected, for example, to the luff of a sail (not shown).

Figure 25:
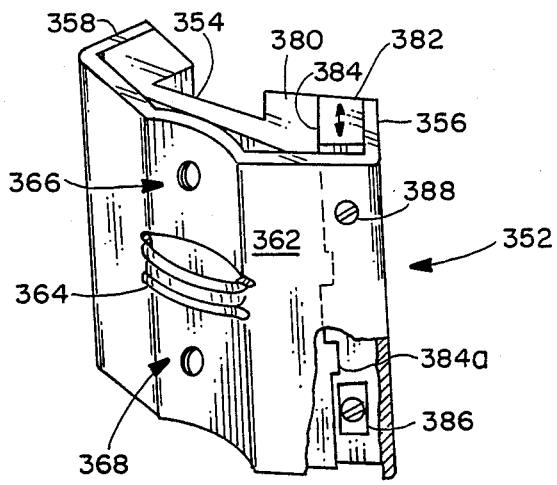
FIG. 25 is a perspective view of an alternate embodiment of car means similar to FIG. 23, without a rail means, with a different attachment means and a roller loading means.

The car means shown in FIG. 25 is another low profile apparatus similar to that shown in FIG. 23 with a different attachment means 364, fastener means location 366, and with a different cover, there being a top curvilinear elongated cover means indentation 368 to engage the top of plastic portion 354 to add strength thereto. Also, it illustrates a different roller loading mean from that shown in FIG. 26.

Figure 26:
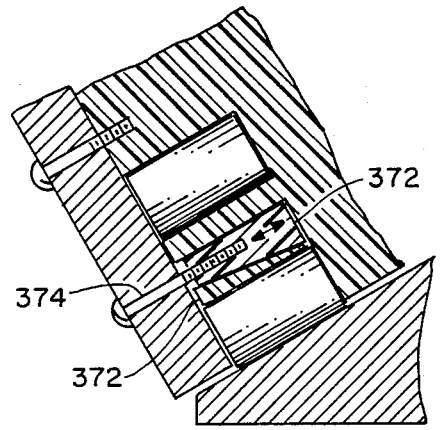
FIG. 26 is a detail sectional view of an alternative embodiment portion of a construction showing an adjustable means of loading the rollers.

The embodiment shown in FIG. 26 is illustrative of one way to load the roller of devices of the type shown in FIG. 24 by having the inner groove surface 370 adjustable to slight degree by moving wedge member 372 by adjustment of screw 374. This is not recommended for high precision devices. When both medium high precision and loading are needed then the alternate embodiment shown in FIG. 25 may be preferred. The plastic body of the car 354 of FIG. 25 is formed into two separate pieces 380 and 382 having a common slide surface plane 384 so that piece 382 may be adjusted along surfaces 384 and the inside of flange 356. The plane 384 is shown diagrammatically on line 385 in FIG. 24A. The two pieces 380 and 382 have mating offset grooves and lug portions 384a shown in dotted lines in FIG. 25 that permit sliding movement in plane 385 while restraining the pieces within the assembly from movement along the vertical axis a shown in FIG. 25. No side fasteners would be used in depending edge 356 of the cover 362. Spring means (flat type) 386 are located intermediate the inside of cover 362 and the car portion 382 to bias the roller means 100 located in, for example, a groove means similar to 350, toward the roller track surface adjacent thereto. A place where body 354 may be separated into two pieces is shown in FIG. 25 on line 385 and as a reference line in both FIGS. 24 and 24a for reference purposes only, since obviously the piece 382 cannot be fastened to the cover means 352 in the side and the groove/lug cooperation cannot interfere with the grooves. Adjustment means 388 are provided to adjust the spring bias 386 as shown in FIG. 25. It will be appreciated that most usages of the 86g type of car means will not be for very high precision use, rather it is contemplated for rugged use. The use of loading means is designed to apply to only a relatively small segment of this type of use.

Figure 27:
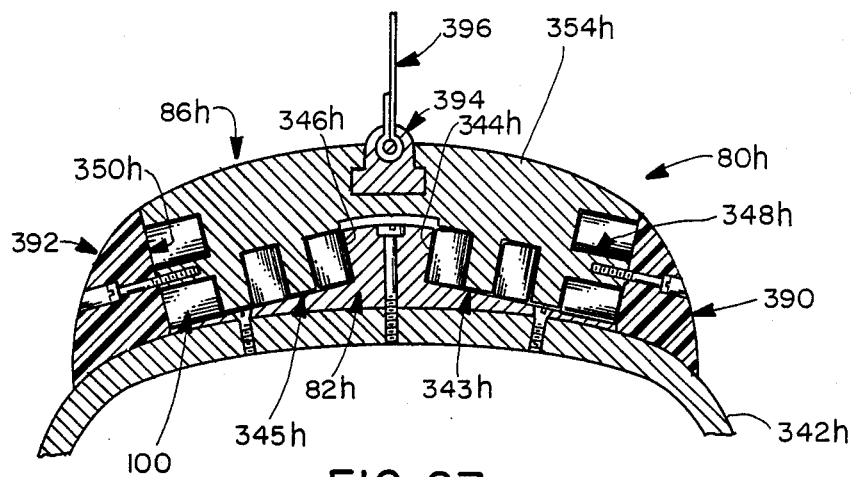
FIG. 27 is a sectional view through an alternate embodiment of car roller and rail means apparatus shown attached to a section of a mast.

The apparatus 80h shown in FIG. 27 has many parts and cooperations similar to the aforedescribed and similar parts shall be identified with the addition of the suffix "h". The apparatus 80h is an extreme of low profile rail track means 82h and car means 86h similar, but more extreme, to that shown in FIGS. 24, 24A and 25. 24. The major differences comprise the body 354h being made of metal and having an attachment means 394 for a sail luff means 396 in the top center thereof as shown. The upper groove means 343h and 345h are canted at an extreme but operable angle to the mast 342h. The roller retaining car plastic side means 390 and 392 retain the roller means 100 in the outboard groove means 350h and 348h as shown. This construction while operable, is at the extreme of low profile in order to present for example low wind interference on a mast. The apparatus will not provide strong load carrying capacities in the upwardly direction because the angle between surface 346 and vertical is quite small.

FIG. 24A is the aforediscussed view of an apparatus 80g' and is as noted, similar to apparatus 80g of FIG. 24 with the profile being higher and the load being evenly distributed on a track means 82g'. The track means 82g is similar in construction to that shown in FIG. 6 and the roller means 100 will have similar load bearing capabilities in all four quadrants. This construction has a more universal use profile for a plurality of field environments. For example it may find usefulness on a sailboat boom traveler or on a Genoa sail block, and could also be used for a luff member for attachment on a mast or for the foot of a main sail for attachment to a boom. It may be manufactured in a variety of sizes.

Figure 28:
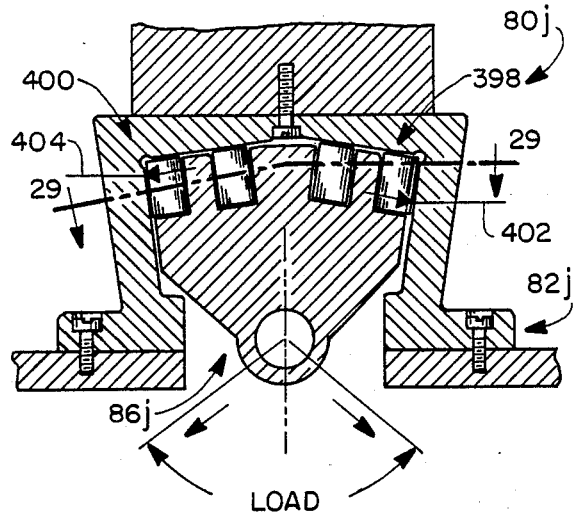
FIG. 28 is a sectional view showing another embodiment of rail means and car means apparatus embodying the inventive concepts at the extremes of design.
Figure 29:
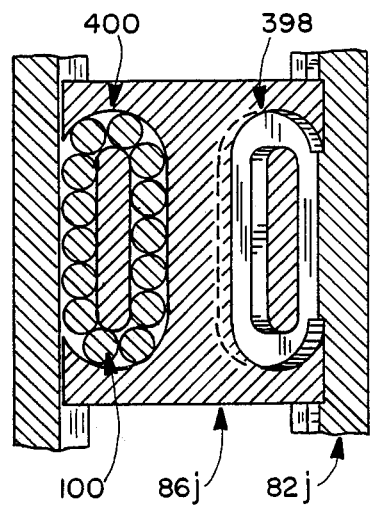
FIG. 29 is a sectional view along lines 29—29 of FIG. 28.

FIGS. 28 and 29 show an alternate embodiment 80j which has parts which are similar in function to those aforedescribed and similar parts shall have similar reference numbers with the addition of the suffix "j". The apparatus 80j is illustrative of a car means 86j and rail track means 82j where, in a sense, there is a reversal of parts. As shown, the rail track means has a clam shell like construction as viewed FIG. 28 and the car means sides within. The groove means 398 and 400 of the car means 86j are formed in the top surface as shown. The construction shown is an extreme construction of an assembly where the load is essentially downwardly. The coaction of the internal rail surfaces with the roller means 100 in the groove means 400, for example, is similar to that shown in FIG. 22 when that figure is rotated approximately 172 degrees in a clockwise direction and the other groove means 398 is in mirror image relationship. The angularity of offset from the axis is shown by arrows and reference lines 402 and 404. In practice, the rotation of the groove/track means of FIG. 22 relative to horizontal is more likely to be in the 95-120 degrees of rotation so that maximum use is made of the roller strength in the primary load area shown. Again simple extrusion may be made and with only cut off and machining of grooves being required. It will be seen that the end surfaces of the rollers 100 do not normally come into engagement except in the unexpected transitory situation.

Figure 30:
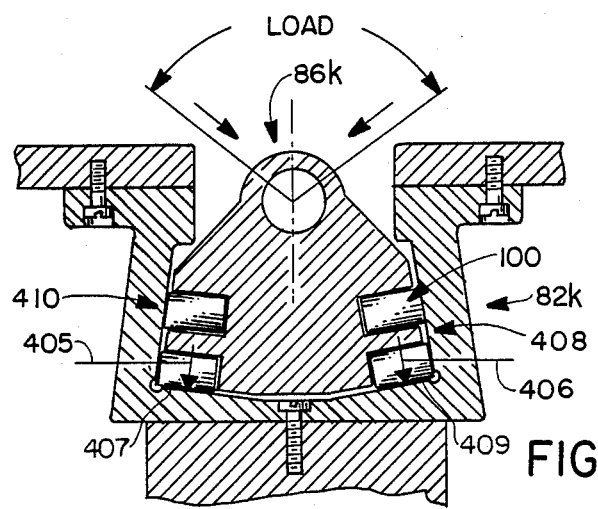
FIG. 30 is a sectional view of an alternate embodiment.
Figure 64:
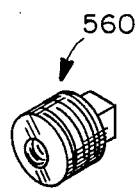
FIG. 64 is a perspective view of an end plug used in the assembly shown in FIG. 48.
Figure 65:
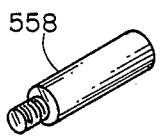
FIG. 65 is a perspective view of a spindle means shown in FIG. 48.

The apparatus 80k shown in FIG. 30 is similar to the aforedescribed and similar parts will use similar references numbers with the addition of the suffix "k". In the apparatus 80k, the orientation of the rail track means 82k and car means 86k is that of rotation of the figure in FIG. 22 approximately 100 degrees in a clockwise direction. As shown by arrows and reference numbers 405 and 406, the rollers engage rail surfaces 407-409 at a shallow inclination to horizontal. In practice this inclination would be more in a preferred range of a 30-60 degree inclination with most likely range being 40-50 degrees. The apparatus 80k is similar to the apparatus 80j rotated 18 degrees with groove means 408 and 410 being formed in the side of the car means 86k rather than the top surface. The primary load area is from the top as is shown in FIG. 30. This is the reverse of apparatus 80, of FIG. 28. In the apparatus 80k of this figure, the transient loads outside of the primary loads will cause the end surfaces of the roller means to engage interior side walls of the track means for sliding thereon. The primary load will be in the load area as shown, but again this design is to illustrate an extreme.

The apparatus 80m shown in FIG. 31 is an embodiment similar in many respects to those aforedescribed and similar parts will be identified with similar reference numbers with the addition of the suffix "m". The apparatus 80m incorporates a disc like roller 412 which has a diameter 416 exceeding its length 414, the ratio being shown as approximately the reverse of the ratio shown of the roller means 100 in FIG. 10. The rail track means 82m first surface means 88m is wider W/B84m than surface means 88 and the width W/A92 of second rail track surface means 90m is shorter than that of surface 90 of FIG. 1 since roller surface 412 is much smaller. The groove means 182m and 184m are complimentary and thus shallower and wider as shown.

The rail track surface 142m and 146m have more working surface area than FIG. 1 surfaces 142 and 146 for sliding engagement with end surfaces 416 of the roller means 412 in groove means 422–424 of the car means. The groove means 418 and 420 are in 90 degree offset relationship to groove means 182m–184m as shown. The rail track means 82m is formed with additional rail track surfaces 418 and 420 which are parallel with surfaces 144m and 148m respectively. The rail track surfaces 142m and 146m are shown inclined approximately 60 degrees from the vertical Y-Y' axis and it will be appreciated that this is to be considered illustrative and that, depending on expected usage, inclinations in the range of 25 or 55 degrees are envisioned.

The apparatus 80n shown in FIG. 33 is an alternate embodiment essentially similar to the upper portion of the apparatus shown in FIG. 31 and similar portions will have similar reference numbers with the addition of the suffix "n". In this embodiment, surface 142n is, in a sense, cut off shorter so as to be less wide than surface 142m with the elimination of surfaces 418 and 420. As shown, there is a single groove means 182n–184n on each inner side of the car means and thus end or diameter surfaces 416 of the roller means 412 take the vertical downward loading in sliding engagement with surfaces 142n and 146n, and surfaces 414 take the upward loads on surfaces 144n and 148n.

The apparatus 80p shown in FIG. 34 shows an hour glass or wasp-waisted shape in cross section. Car means 86p and similar parts to those previously described will be identified with similar reference numbers with the addition of the suffix "p". The rail track means 80p may be extruded to provide four track surfaces on each side and may be thought of as being rail track 82a turned inside out to provide four upper rail track surfaces, 142p, 144p, 146p and 148p. In mirror image are four lower track means surfaces 208p, 210p, 212p and 214p. While the endless roller grooves formed in the car means sides are shown as of the type to accept rollers 100, it is to be noted that shallow grooves are equally intended to take disc type roller means 412. The device 80p will accommodate heavy loads from all quadrants. The angularity between surfaces 208p and 142p (and opposite surfaces 214p and 146p) may be changed.

The apparatus 80q shown in FIG. 35 is generally similar to that previously discussed and similar parts shall have similar reference numbers with the addition of the suffix "q". The car means 86q is shown in FIG. 37 and the rail means 82q is shown in FIG. 36. The apparatus 80q is similar to apparatus 80p except that the lower endless groove means 426–428 opposite rail surfaces 210q and 212q are formed in the bottom surface of the car means 82q. The car means 86q is not wasp-waisted and the assembly 80q has a lower profile than 80p. The track surfaces 142q and 146q are elongated so that rollers in both of the upper and lower groove means cooperate therewith as shown. Note that groove means 182q and the surfaces 142q and 144q that cooperate therewith have been rotated approximately 75 degrees in a counter clockwise direction compared to the generic figure of FIG. 22. This is to be considered illustrative, not necessarily the best angularity depending on field needs.

The apparatus 80r set forth in FIG. 38 indicates an apparatus similar to that shown in FIGS. 23–25 turned inside out and similar parts will have similar reference numbers with the suffix "r". The rail track means 86r has a clamshell like shape in cross section and has four internal rail track surfaces on each side, 208r, 210r, 142r and 144r on the right side as shown and 212r, 214r, 146r and 148r on the left. The lower groove means 430–432 in the car means 86r cooperate with surfaces 208r–210r and 212r and 214r. The car means 86r cover/attachment means 362r having a depending loop 364r also serves as a side wall of each of the groove means 430–432. The cover attachment means 362 also adds strength to the plastic body shown. The body of the car means 86r may also be formed of metal. It will be noted that car means 82r groove means may have a different orientation to each other from that shown and each part of rail track surfaces may also have a complimentary different relative orientation. For example see the orientation shown in FIG. 39 where the apparatus 80s is substantially similar but provides a lower profile.

The apparatus 80s has similar parts and in this embodiment are identified with the suffix "s". The only substantial difference between FIGS. 38 and 39 is the vertical height and reorientation of the grooves 182s–186s, 208s–212s and rail track surfaces 208s, 210s, 142s, 144s and 148s, 146s, 214s and 212s.

The apparatus 80t shown in FIG. 40 shows an alternate embodiment similar in many respects to the aforedescribed embodiments and similar parts shall bear similar reference numbers with the suffix "t". The apparatus 80t shows a clamshell rail means 82t with a car means 86t that rides therewithin as shown. The apparatus 80t has an extreme orientation of the groove means 182t–184t relative to the lower groove means 430t–432t for illustrative purposes. The apparatus 80t is well adapted to receive heavy loads on the depending attachment loop shown but is not adapted to handle equivalent loads in the reverse direction. The end surfaces of the rollers 100 will handle transitory and medium loads in the reverse direction.

The apparatus 80u of FIG. 41 is similar in many respects to those previously discussed and similar parts will be marked with the addition of the suffix "u". In this embodiment the track means 82u is also of clamshell shape to surround the interiorly mounted car means 86u which moves therewithin. The upper and lower groove means 182u and 208u shown in FIG. 42 are of the shallow type to accept disc shaped rollers 412. It will be observed that other than groove means depth, the apparatus 80u is quite similar in shape and construction in material respects to the apparatus 80t shown in FIG. 40. It will also be noted that while disc shaped rollers 412 may be disposed in the grooves 182t, 184t, 430t and 432t of the embodiment shown in FIG. 40 in place of the rollers 100, an operative device will not obtain with the placement of rollers 100 in the apparatus 80u of FIG. 41.

The track means 82v of FIG. 43 is an alternate embodiment to the track means shown in FIGS. 6 and 7 and when placed back to back as shown in FIG. 44 provide the same rail track surface functions as the double X track means shown in FIGS. 11 and 12 when rotated 90 degrees. Similar parts will have similar reference numbers with the addition of the suffix "v". Heretofore the track means 82 and 82a have been discussed as being high precision extrusion or machined. (Obviously they may also be of sintered construction or molded.) The track mean 82v provides the required angularly disposed rail track surfaces by high precision roll forming techniques. For example the complex shape shown could be made of corrosion resistant sheet stock material such as stainless steel. It will be noted that the form is such (in cross section) that the transverse top 434 (in FIG. 43) forms a supporting strut to support rail track surfaces 144v and 148v. The bottom is formed with supporting strut structure 436 as shown with attachment means 438 tending to cause the respective struts 434 and 436 to engage and support the back sides of the rail surfaces adjacent thereto.

The apparatus 80w shown in FIG. 45 is an embodiment of an apparatus that is essentially similar to that shown in FIG. 41 with a much lower profile and with the upper portion of the car means 86u and the upper groove means being removed so that only the lower track means 432w and 430w are operative. This design is illustrative only and is extreme to illustrate limits of design.

The rail track means 82x of FIG. 46 is similar to that show in FIG. 6 except that it is formed of a hard resin. It is preferably made as a plastic extrusion. A plastic which is thermo setting and maintains a high dimensional stability over a wide range of temperatures and will withstand extreme environments may be used although thermo plastic resins are now available commercially which are of the order of tensile strength approaching 69-75% of the tensile strength of aluminum, while maintaining dimensional stability under environmental uses. The cost of these high tech thermo plastic resins is presently approximately 8 times the cost of aluminum. The rail track means may also be made of titanium where high strength to weight is important, and cost is not important.

Figure 3:
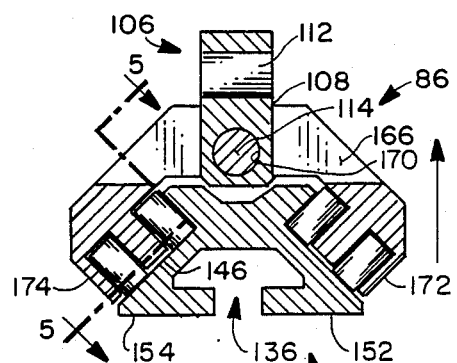
FIG. 3 is a sectional view along lines 3—3 of FIG. 2.
Figure 4:
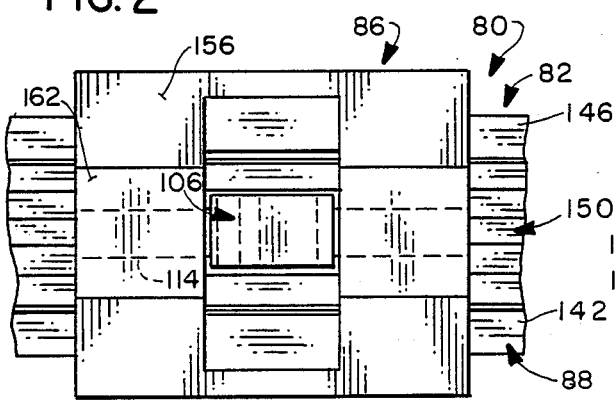
FIG. 4 is a top view of the portions of the apparatus shown in FIG. 2.

The car means 86y shown in FIGS. 47, 47A and 47B is similar to the car means 86 shown in FIGS. 3, 8 and 9 except that rather than one piece, is is made of three pieces fastened together with a cover/attachment means 448. The suffix "y" will identify similar parts. More particularly each half of the plastic molded cars 442 and 446 is formed identically with complimentary lugs 443 and mating grooves 444 so that the identical halves 442 and 446 may be assembled together and held in place by the cover/attachment means 448 and fasteners 450. This construction is relatively inexpensive as only a single mold is required to form the grooves 182y for the rollers.

The apparatus 460 shown in FIG. 48 may be called a Z tower. It may provide relative movement on a Z axis of an XYZ apparatus (see FIG. 20 phantom lines) or may stand alone mounted on a base. The apparatus 460 is of the type where precision movement is desired, the movement here being shown as applied to a dispensing head means 462 moving toward and away from a work area means 464, here shown as a rotary table in phantom lines of FIG. 48.

The tower apparatus 460 comprises a base plate 466, the up down tower means 468 having a lower tower base 470 and movable car means 472 having vertical movement on the tower means 468 to in turn move dispensing head means 462. The tower means 468 comprises elongated rail track means 474 shown in section in FIG. 48B, in isolated side elevational view in FIG. 50, top view in FIG. 52 and bottom view in FIG. 51.

As will be apparent from FIGS. 48B, 51 and 52, the rail track means 474 is substantially identical to the rail track means 82a of FIG. 12 with some additional machined changes More particularly, the rail track means 474 has bottom end 476, top end 478, cross elongated slots 480 in the midportion, three through bores 482, 483 and 484 for attachment to the the base 470 and for air passage fitments, and threaded mounting holes 485 for mounting O ring sealed top cap means 486 mounting an air nozzle fitment 487. The cap 486 is formed with a pair of O ring grooves 488 and 488a as shown in FIG. 54 to sealingly mount to top end 476 and close the bore 206 of the rail track means 474.

A double headed air piston means 490, shown in perspective in FIG. 55, is mounted in base 206 and has an elongated shaft 492 having an enlarged central section 493 having a pair of through cross bores 494. These cross bores 494 accept the cross mounting and loading bolts 495 to mount the car means 472 for movement as shown in FIGS. 48 and 48B. The head ends 496 and 497 of the air piston means 490 are enlarged and have a pair of O rings grooves to mount O rings to seal the head ends 496 and 497 with the bore surface 206. Thus, when piston means 490 is disposed interiorly of the bore 206 the area between the cap 486 and the head 496 becomes an air chamber 506 for causing movement of the piston means 490.

The tower means 468 has a sealingly mounted bottom end cap 498 (see FIG. 53) having an elongated body 499, enlarged head 500 with an O ring groove not shown, through bores 501, 502 and 503, and an O ring retaining groove 504 for mounting an O ring to seal the cap shaft 498 and bore 206 of the bottom of the rail track means 474. Bore 501 mounts an air fitment (not shown) for communication with axis bore 505 (shown in dotted lines) to admit and exit air from the chamber 508 located intermediate the piston O-rings on head 497 and the O ring in groove 504 of the bottom cap. Similarly air may be admitted or exited through fitment 487 and bore 489 of the top cap 486 to cause the upper chamber 506 to be pressurized. Alternate pressurizing and depressurizing of chambers 506 and 508 will cause the reciprocal movement of piston 490 relative to rail track means 474 and movement of car means 472 through the combination mounting and roller loading pins 495. The bores 502 and 503 are mounting bores for mounting the rail track means to tower base 470 and cooperate with bores 483 and 484 of the rail track means 474.

The car means 472z shown in FIG. 48B is essentially identical to the car means shown in FIG. 19 and similar parts shall have similar reference numbers with the addition of the suffix "z". As shown the car means portions 316z and 318z are formed with a pair of threaded and non threaded bores 510 and 512 for cooperation with the cross loading mounting pins 495 which load the rollers 100 in the groove means against the rail track means 474 cooperating surfaces and simultaneously mount the car means to the piston means for movement.

By pushing the two spaced cars 316z and 318z apart, as shown in FIG. 48B, loading of the roller means 100 in all grooves against the cooperating rail surfaces is obtained and precision movement will be accorded to the dispensing means 462. The dispensing means 462 is attached to L shaped mounting plate 514 which in turn is mounted to car 316z as shown. The bores 510 and 512 for the loading pins 494 are located on the the Y axis of the cars (as viewed in FIG. 6). This location does not interfere with roller grooves or rollers 100. It will be appreciated that movement of the cars 316z-318z and dispensing head means 462 is limited by the dimension of the slot 480 in the track means and the pins 584 therein.

To prevent overtravel of the cars 316z–318z and for their control and actuation purposes, proximity switches or limit switches 516 and 518 may be adjustably mounted to the right hand portion of the rail track means 474 by a pair of adjustable clam shell shaped holders 520 (see FIG. 56). The holders 520 are conveniently made from the same base extrusion as the car means 86 shown in FIG. 8. However no roller grooves are formed therein, but suitable mounting set screws 530 are angularly disposed in bores 572 and 524 for adjustable engagement with rail track surfaces 142z and 146z to cause in turn, engagement of surfaces 524 and 526 with the track surfaces 144z and 148z as shown in FIG. 48B. The holder means 520 mounts switches 532 in bores 534 for engagement or sensing of the car means 316z with the sensors/probes or plungers 534.

The base 470 shown in FIG. 57 mounts the rail track means 468 by a cross mounting pin 536 which extends through the base 470 in bore 542 and through bore 484 in the rail track means and bore 503 of the lower cap means. The base 470 in turn is mounted to plate 466 by a fastener in bore 538 and clamping engagement of mounting pin 536 is effectuated by a clamping bolt in bore 540.

It will be observed that outboard to the right in FIG. 48 there is located a work piece mover means 544 for rotating a rotary table 546 shown in phantom lines in FIG. 48. The work piece mover means comprises a base means 548, track means 550, piston means 552, track means 554, pinion means 556, spindle means 558, end means 560 and 562 and fastening means 564 for mounting the assembly to plate 466.

Figure 66:
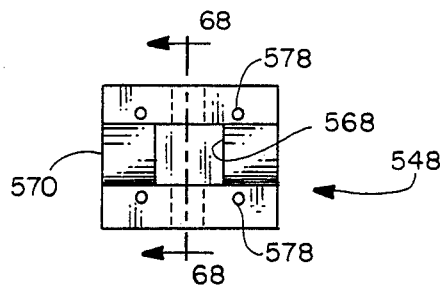
FIG. 66 is a front elevational view of the mounting plate shown in the apparatus of FIG. 48.
Figure 67:
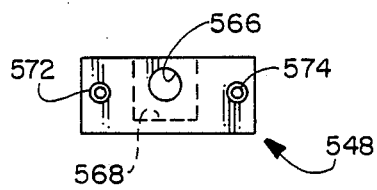
FIG. 67 is a side view of the plate shown in FIG. 66.
Figure 68:
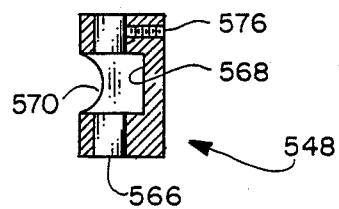
FIG. 68 is a sectional view along lines 68—68 of FIG. 66.

The base means 548 comprises a rectilinear shaped member having a through bore 560 (see FIGS. 68 and 69) a rectilinear deep chamber 568, a curvilinear groove 570, top through bores 572–574 for the fastener means 564, intersecting bore 576, and four rail track mounting bores 578 as shown in FIG. 66. The base 548 mounts the track means 550 at the mid portion rectangular cutout 580 as shown in FIGS. 60 and 61. The track means cutout has a groove 582 along the long dimension for receipt of a pin 584 mounted on the piston means 552 mid section shown in FIG. 62 to limit travel of the piston means 552 in the bore 206 of the track means. The bore 566 of the base 548 mounts the rotary turntable spindle pin 558 which is attached to pinion means 556 and a suitable thrust bearing (not shown). The pinion/thrust bearing is located in chamber 566 as shown in FIG. 48A for cooperation with tooth portions 554 of the rack/piston means 552.

The combination piston/rack means 552 has an elongated mid section 588 which has a toothed section on one side and mounts piston heads 590–592 at the ends which are grooved to mount 0 rings 594 as shown in FIG. 49. The piston means 552 is mounted within the bore 206 of the rail track means there being sealingly mounted end caps 560 and 562 to provide air chambers 594–596 for a double acting air cylinder action through pneumatic circuitry (not shown) attached to suitable fitments on the end caps 560 and 562. By alternately pressurizing and depressurizing chambers 594 and 596, the piston means will cause the toothed portion to rotate the pinion means 556 and spindle 558 and thus work pieces on table 546 in the work area 464 below the dispensing outlet 462. The adjustable stops 598 and 600 (see FIG. 48A) are similar in construction to holder 520 except that finger actuatable adjustment set screws 602 are used to adjust same. The adjustable stops prevent or limit travel of the rack pin 584 in groove 562 and thus controls amount of rotation of the spindle 558 and the work pieces thereon.

The various combinations of rollers, car means and track means in various orientations and in combination with other apparatus has been shown and described. Various changes and modifications in the illustrated embodiments of the invention will suggest themselves to those skilled in the art and can be made without departing from the spirit of the invention. All such changes and alternatives are contemplated as may come within the scope of the appended claims.

I claim:
1. A slide roller bearing apparatus comprising:
   (a) a rail track means having a length for receiving roller means for relative moving engagement there along, said rail track means having a first rail track surface means and a second rail track surface means, each of said first and second rail track surface means having a length and a width,
   (b) a car means operatively associated with said rail track means for movement relative to the length thereof, said car means having a first car surface means and a second car surface means,
   (c) roller means having a length and a diameter disposedly associated with the said rail track means and the said car means to permit rolling movement of said car means relative to the length of said rail means, said roller means having a roller first surface means and a roller second surface means,
   (d) attachment means operatively associated with said car means and said rail means whereby said movement of the car means relative to said rail track means may be usefully employed,
   (e) wherein said roller first surface means is characterized as having a diameter dimension and said roller second surface means is angularly disposed relative to said roller first surface means and said roller second surface means is characterized as having a length dimension of relative size to said diameter dimension when measured on an axis generally transverse to said roller first surface means, said roller first surface means being further characterized as being operatively associated only with said first rail track surface means and with said first car surface means, said roller second surface means being further characterized as being operatively engagable only with said second rail track surface means and said second car surface means.

2. The apparatus set forth in claim 1 wherein said length dimension of said roller second surface means is larger than said diameter dimension of said roller first surface means.

3. The apparatus set forth in claim 1 wherein said length dimension of said roller second surface means is shorter than said diameter dimension of said roller first surface means.

4. The apparatus set forth in claim 1 being further characterized and wherein at least said first rail track surface means is of high relative lubricity and the geometry of the engagement of said roller first surface means with said first rail track surface means causes said roller means to be confined in said car means when said roller second surface means is in operative engagement with second rail track surface means.

5. The apparatus set forth in claim 4 wherein said second rail track surface means is also characterized as being of high relative lubricity and said roller means is confined in said car means by said second rail track surface means when said roller first surface means is in engagement with said first rail track surface means.

6. The apparatus set forth in claim 5 wherein said association of said roller first surface mean with said first rail track surface means is a sliding engagement and said operative engagement of said roller second surface means with said second rail track surface means is a rolling engagement.

7. The apparatus set forth in claim 1 wherein said first car surface means and second car surface means are located on the exterior of said car means in mirror image relationship respective to said first rail track surface means and said second rail track surface means formed in the interior of said rail track means.

8. The apparatus set forth in claim 1 wherein said first car surface means and second car surface means are located on the interior of said car means in mirror image relationship respective to said first rail track surface means and said second rail track surface means which are formed in the exterior of said rail track means.

9. The apparatus set forth in claim 1 wherein said rail track means and car means are formed from aluminum and further characterized as each having all surfaces treated to provide a hard anodized surface coating of high lubricity which resists corrosion and provides for low friction sliding engagement of the said roller first surface means relative to said first rail track surface means.

10. The apparatus set forth in claim 1 wherein said rail track means is characterized a being roll formed.

11. The apparatus set forth in claim 1 wherein both said car means and said rail track means are formed by metallic extrusions.

12. The apparatus set forth in claim 1 wherein said car means is formed with at least two separate roller receiving integral groove means and said roller means is located and confined in each of said roller receiving integral groove means in said car means, said roller means being retained in the apparatus and between said first car surface means and said first track surface means solely by said roller receiving integral groove means and said first track surface means.

13. The apparatus set forth in claim 12 wherein said roller receiving integral groove means comprises said first car groove surface means and second car groove surface means, said first and second car groove surface means are disposed at substantially right angles to each other and each form a portion of an endless closed roller track means for controlling essentially infinite roller movement of said roller means in said closed roller track means while permitting load bearing engagement of said roller first surface means with said first car groove surface means and said first track surface means, and load bearing engagement of said roller second surface means with said second rail track surface means and said second car groove surface means.

14. The apparatus set forth in claim 13 wherein the load bearing engagement of said roller first surface means with said first car groove surface means is a non rolling engagement.

15. The apparatus set forth in claim 12 wherein said roller receiving integral groove means is endless in nature and forms an endless track having first and second spaced groove portions, said first groove portion being operable to present said roller second surface means into operative rolling load bearing engagement with said second rail surface means, said second groove portion being separated, spaced from and parallel to said first groove portion and operable to endlessly retain said roller first surface means for load bearing engagement with said first rail track surface means, the space between said second groove portion and said first groove portion being a predetermined width dimension, said first rail track surface means being formed with a second width dimension, said second width dimension being greater than said predetermined width dimension and characterized as being sufficiently large whereby each of a plurality of roller means located in and filling said roller receiving integral groove means, have their respective first roller surface means engagable with said first rail track surface to thereby be confined in said integral groove means in a manner preventing escaping movement along said axis transverse to said roller first surface means and permitting load bearing non rolling sliding movement between each of said roller first surface means and said first rail surface means.

16. The apparatus set forth in claim 15 wherein said first and second parallel groove portions of said endless closed track are each formed with said first and second car surface means, said second car surface means is spaced from said second rail track surface means a dimension substantially equal to said diameter, each of said first car surface means adjacent said first and second groove portions of said endless closed track means is spaced from said first rail track surface means of said rail track means by at least said length dimension when said roller second surface means is in load bearing engagement with said second rail track surface means, said roller second surface means of said roller means being in physical contact with said rail track second surface means when the direction of load upon said car means is in opposition to said second rail track surface means and said roller first surface means may be in floating contact with said first rail track means when the direction of a load on said car means is away from said first rail track surface means.

17. The apparatus of claim 12 wherein said car means is formed with first side means and second side means, said rail track means is formed with third rail track surface means, fourth rail track surface means, fifth rail track surface means, and sixth rail track surface means, said first car side means being formed with first and third integral endless groove means, said second car side means being formed with second and fourth integral endless groove means, a plurality of roller means disposed in each of said first, second, third and fourth endless groove means for cooperation with said first, second, third, fourth, fifth and sixth rail track surface means.

18. The apparatus of claim 17 wherein said rail track means is formed with seventh rail track surface means and eighth rail track surface means, said roller means disposed in said third endless groove means cooperating with said seventh rail track surface means and said roller means disposed in said fourth endless groove means cooperating with said eighth track surface means, said first, fourth, sixth and seventh track surface means being disposed in parallel relationship to each other and said second, third, fifth and eighth rail track surfaces being disposed in parallel relationship to each other.

19. The apparatus of claim 17 wherein said attachment means for said car means is formed with integral roller retention means surfaces.

20. The apparatus set forth in claim 1 wherein said rail track means comprises third rail track surface means and fourth rail track surface means, said car means comprises a third car surface means and a fourth car surface means, said first and third rail track means and said first and third car surface means each being respectively disposed in substantially mirror image relationship to each other, said second and fourth rail track surface means and said second and fourth car surface means each being respectively disposed in mirror image relationship to each other, said roller means also being disposed between said third rail track surface means and said third car surface means, and said roller means also being disposed between said fourth rail track surface means and fourth car surface means.

21. The apparatus set forth in claim 20 wherein the rail track means comprises an extrusion.

22. The apparatus set forth in claim 1 wherein endless groove means is formed in said car means, said first rail track surface means has a surface width more than two times greater than said diameter dimension of said roller first surface means whereby the roller first surface means of each of all of a plurality roller means disposed in said endless groove means may simultaneously engage said first rail track surface means and said roller second surface means of a plurality of said roller means may load bearingly engage said second rail track surface means when said roller first surface means of said plurality of roller means is not in engagement with said first rail track surface means.

23. The apparatus set forth in claim 22 wherein said car means comprises an extrusion characterized as having machined endless groove means whereby said first car surface means and second car surface means are in precise relationship.

24. The apparatus set forth in claim 1 wherein said second rail track surface means is curvilinear along the length thereof and said second car surface means is formed with a curvilinear surface which may be disposed in parallel relationship to said curvilinear surface of said second rail track surface means.

25. The apparatus set forth in claim 1 wherein the width of said second rail track surface means is more than fifty per cent greater than the width of said first rail track surface means and said second rail track surface means is disposed at substantially right angles to s id first rail track surface means along the length thereof.

26. The apparatus set forth in claim 1 wherein the width of said second rail track surface means is less than fifty per cent of the width of said first rail track surface means and said second rail track surface means is disposed at substantially right angles to said first rail track surface means along the length thereof.

27. The apparatus set forth in claim 1 wherein said car means is formed of moldable thermosetting plastic 28. The apparatus set forth in claim 27 wherein said moldable thermosetting plastic car means comprises a first car portion means and a second car portion means, said first car portion means and second car portion means being substantially identical in shape and disposed in assembled mirror image relationship.

29. The apparatus of claim 28 further characterized as having said attachment means cooperating with the car means, said attachment means being operable to retain said first car portion means and second car portion means in assembled relationship while providing an operative connection of said car means for useful work.

30. An apparatus comprising rail track means, car means and plurality of roller means disposed between said rail track means and car means, said rail track means having first and second rail track surfaces disposed at right angles to each other and engagable with said roller means, said car means having first and second car surface means, said first and second car surface means being disposed at right angles to each other, said first car surface means being formed and disposed in spaced parallel relationship to said first rail track surface means, said second car surface means being formed and disposed in spaced parallel relationship to said second rail track surface means, endless U shaped open groove means for receipt of said roller means and formed in said car means, said endless U shaped open groove means having a first side means, a second side means parallel to said first side means, and a base means transverse to and connecting said first and second side means, said base means being formed and disposed in spaced parallel relationship to said first car surface means and said first rail track surface means, said first and second side means of said groove means being formed and disposed in spaced parallel relationship to said second car surface means, said endless groove means having a remote portion located remote from said second car surface means, and a near portion located adjacent to said second car surface means, said near portion being characterized as having at least a portion of said second side means of said groove means removed so that said plurality of roller means when disposed in endless array in said groove means may have at least the portion of the roller means in the said near portion be presented for engagement with said second surface means, each of said roller means being formed with a first surface means and a second surface means transverse to said first surface means and each being disposed in said endless groove means intermediate said car means and said rail means, said apparatus being characterized that when the relative load upon the apparatus is away from said base means and toward said rail first surface means then said first surface of said roller means will be urged by said base means toward engagement with said first rail surface means, and when the relative load on said apparatus is toward said rail second surface and away from said groove means near portion first side means, then said second surface of said roller means is urged toward said second rail surface means by said first side means of said groove means.

31. The apparatus set forth in claim 30 wherein said first surface of said roller means is a rolling surface and second surface is an end surface transverse to said first surface.

32. The apparatus set forth in claim 30 wherein said second surface of said roller means is a rolling surface and said first surface of said roller means is an end surface generally transverse to said second surface.

33. The apparatus set forth in claim 30 wherein said roller means is characterized as being formed of a material softer than said rail track means whereby debris disposed intermediate said rail track means and said roller means will tend to damage said roller means rather than said rail track means.

34. The apparatus set forth in claim 33 wherein said roller means is formed of plastic material.

35. The apparatus set forth in claim 30 further characterized such that each of the said plurality of roller means first and second surfaces has a different dimension, one of said roller means first and second surfaces has dimension "d" and the other has a dimension "f", said endless groove means in said remote portion has a dimension "e" between the spaced first side means and second side means, said base means is spaced from said first rail surface means a dimension "h" and from said first car surface means a dimension "g", said first car surface means is spaced from said first rail surface means a dimension "a", said near portion first side means is spaced from said second car surface means a dimension "c", said roller means first surface is spaced from said rail first surface means a dimension "b", and said base means is spaced from said rail surface means a dimension "h", said dimension "g" is always less than "f", "a" is always greater than "b", "d" is always greater than "c" whereby when said base surface and said rail car first surface means each become a load bearing surface engaging the roller means therebetween, dimension "f" will equal dimension "h", and dimension "b" will equal 0, and said first car surface means will not engage said first rail car surface means.

36. The apparatus set forth in claim 30 characterized such that:
dimension "a" is a positive distance between the first rail surface means, and the first car surface means,
dimension "b" is a dimension that may range between 0 and a positive amount representing the distance between one of said roller means first and second surfaces and said first rail surface means and dimension "b" is always less than dimension "a",
dimension "c" represents the dimension between said first side means of said near portion and said second rail surface means,
dimension "d" is the cross-sectional dimension measured transversally through an axis of each of said roller means, said axis being substantially parallel to said second rail surface means, said dimension "d" always being greater than dimension "c",
dimension "e" is the dimension of said base means connecting said first and second side means, said dimension "e" always being greater than dimension "d",
dimension "f" is the cross-sectional dimension of each of the roller means taken along said axis,
dimension "g" is the dimension between said base means and said first rail surface means,
dimension "k" is the dimension between said roller second surface means and is an amount of 0 or a positive amount,
dimension "l" is the dimension between said groove means near portion first side means and said second rail surface means, and
wherein at such time as the load on the apparatus is being borne by said second rail surface means and said first side wall means in said near portion of said groove means through the roller means located in said groove means, then dimension "k" will equal 0 and dimension "h" will be greater than dimension "f" and will equal dimension "f" plus "b" and "a" plus "g".

37. The apparatus set forth in claim 30 wherein said car means is fixed and said rail means is movable.

38. The apparatus set forth in claim 30 wherein said rail means contains an internal chamber means and first mover means associated with said internal chamber operative to cause relative movement of said car means and said rail means on said roller means.

39. The apparatus set forth in claim 38 wherein said said first mover means is a ball screw means.

40. The device set forth in claim 39 wherein said first mover means further comprises computer controlled stepper motor means operative to cause movement of said ball screw means relative to said rail means to cause precise relative movement of said car means to said rail means.

41. The apparatus set forth in claim 38 wherein said first mover means is a piston means and said chamber means is formed from side walls of said chamber means.

42. The apparatus set forth in claim 41 wherein there is bias/mounting means associated with first and second cars, said bias/mounting means being operative to tie said first and second cars for simultaneous movement relative to said rail means and to bias one of said roller first and second surface means of said roller means located in each of said groove means into load bearing engagement with one of said sets of first and second surfaces means of said rail means.

43. The apparatus set forth in claim 38 wherein said car means comprises first and second cars, said rail means comprises four sets of first and second rail surface means disposed at 90 degree intervals in substantially symmetrical array around said chamber means, each of said first and second cars having a pair of symmetrically disposed groove means for a plurality of roller means therein for cooperation with one of said sets of first and second rail surface means.

44. The device set forth in claim 43 further comprising a second rail means and third and fourth cars mounted for relative movement to said second rail means, said second rail means and said third and fourth cars being disposed in vertically offset relation at substantially right angles to said rail means and said first and second cars.

45. The device set forth in claim 44 further comprising second mover means for causing relative movement of said third and fourth cars to said second rail means.

46. The apparatus set forth in claim 45 further characterized wherein said third and fourth cars are substantially fixed relative to each other and to said first and second cars whereby movement of said first and second cars causes movement of said second rail means and movement of said third and fourth cars causes movement of said rail means.

47. The apparatus set forth in claim 46 wherein said second mover means comprises second computer controlled stepper motor means and second ball screw means, said second computer controlled stepper motor means and second ball screw means being operative to cause precision relative movement of said third and fourth car means to said second rail means, said apparatus being further characterized as on of said rail means and first and second cars having an end, said end being movable to a position in a plane in multiple X and Y positions under the control of said first and second mover means.

48. The device set forth in claim 47 further characterized by third rail means, fifth and sixth cars associated with said third rail means for relative movement thereto, third mover means for causing relative movement of said fifth and sixth cars relative to said third rail means, one of said third rail means and said fifth and sixth cars being fixed relative to said end, said third rail means being disposed at right angles to both said rail means and second rail means, whereby said third mover means causes relative movement of said third rail means and fifth and sixth car means in a Z plane to the X and Y planes of said rail means and second rail means.

49. The device set forth in claim 48 wherein said third mover means is computer controlled and a second end is associated with one of said third rail means and fifth and sixth cars for movement in X Y Z planes 50. The device set forth in claim 49 wherein dispensing means is associated with said second end, and is moved in said X Y Z planes by said first, second and third mover means.

51. The device set forth in claim 50 wherein said fifth and sixth cars are located externally of said third rail means for simultaneous movement relative to said third rail means, said third rail means has first and second remote ends, first and second internal chambers associated respectively with said first and second remote ends, piston means associated with said chamber, said piston means being characterized as being a double acting piston operatively associated with said fifth and sixth cars to cause movement thereof in opposite reciprocating directions upon alternatingly pressurizing and depressurizing said first and second chambers.

52. The apparatus set forth in claim 51 wherein said third rail means is formed with slot means intermediate its first and second ends, connection means attached to said piston means and operatively to said fifth and sixth cars whereby movement of said piston intermediate said third rail means causes movement of said fifth and sixth cars relative to said third rail.

53. The apparatus set forth in claim 52 wherein said third rail means comprises a structure generally similar in cross-sectional configuration to said rail means, and said first, second, third, fourth, fifth and sixth cars are substantially similar in general configuration.

54. The device set forth in claim 53 wherein said slot means is formed in said rail means on opposite sides of the long axis and bisecting the said first and second rail surface means.

* * * * *